(12) United States Patent
Zhang et al.

(10) Patent No.: US 12,039,454 B2
(45) Date of Patent: Jul. 16, 2024

(54) MICROEXPRESSION-BASED IMAGE RECOGNITION METHOD AND APPARATUS, AND RELATED DEVICE

(71) Applicant: Tencent Technology (Shenzhen) Company Limited, Shenzhen (CN)

(72) Inventors: Kaihao Zhang, Shenzhen (CN); Wenhan Luo, Shenzhen (CN); Lin Ma, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 582 days.

(21) Appl. No.: 17/182,024

(22) Filed: Feb. 22, 2021

(65) Prior Publication Data

US 2021/0174072 A1 Jun. 10, 2021

Related U.S. Application Data

(63) Continuation of application No. PCT/CN2019/116515, filed on Nov. 8, 2019.

(30) Foreign Application Priority Data

Nov. 21, 2018 (CN) .......................... 201811392529.7

(51) Int. Cl.
*G06N 3/088* (2023.01)
*G06N 3/04* (2023.01)
(Continued)

(52) U.S. Cl.
CPC .............. *G06N 3/088* (2013.01); *G06N 3/04* (2013.01); *G06T 7/13* (2017.01); *G06V 10/764* (2022.01);
(Continued)

(58) Field of Classification Search
CPC .......... G06N 3/04; G06N 3/045; G06N 3/088; G06T 7/13; G06V 10/764; G06V 10/82;
(Continued)

(56) References Cited

U.S. PATENT DOCUMENTS

2018/0027307 A1 1/2018 Ni et al.
2018/0173942 A1* 6/2018 Kim ..................... G06V 40/174

FOREIGN PATENT DOCUMENTS

CN 106548149 A 3/2017
CN 106570474 A 4/2017
(Continued)

OTHER PUBLICATIONS

Tencent Technology, WO, PCT/CN2019/116515, Jan. 31, 2020, 5 pgs.

(Continued)

*Primary Examiner* — Ruiping Li
(74) *Attorney, Agent, or Firm* — Morgan, Lewis & Bockius LLP

(57) ABSTRACT

Embodiments of this application disclose a microexpression-based image recognition method and apparatus, and a related device. The method includes: obtaining an original expression image belonging to a first expression type, and inputting the original expression image into an image augmentation model; the original expression image belonging to the first expression type being an image including a microexpression; the image augmentation model being obtained by training with a sample expression image belonging to the first expression type and a sample expression images belonging to a second expression type; augmenting, in the image augmentation model, an expression feature of the microexpression in the original expression image to obtain a target expression image belonging to the second expression type; recognizing an expression attribute type corre- (Continued)

sponding to the target expression image, and determining the expression attribute type corresponding to the target expression image as an expression attribute type corresponding to the original expression image.

20 Claims, 8 Drawing Sheets

(51) Int. Cl.
   *G06T 7/13* (2017.01)
   *G06V 10/764* (2022.01)
   *G06V 10/82* (2022.01)
   *G06V 20/20* (2022.01)
   *G06V 40/16* (2022.01)

(52) U.S. Cl.
   CPC .............. *G06V 10/82* (2022.01); *G06V 20/20* (2022.01); *G06V 40/165* (2022.01); *G06V 40/169* (2022.01); *G06V 40/174* (2022.01); *G06V 40/176* (2022.01)

(58) Field of Classification Search
   CPC .... G06V 20/20; G06V 40/165; G06V 40/169; G06V 40/174; G06V 40/176
   See application file for complete search history.

(56) References Cited

FOREIGN PATENT DOCUMENTS

| CN | 106909870 A | 6/2017 |
|---|---|---|
| CN | 107273876 A | 10/2017 |
| CN | 107292256 A | 10/2017 |
| CN | 108491835 A | 9/2018 |
| CN | 108629314 A | 10/2018 |
| CN | 108710829 A | 10/2018 |
| CN | 108830237 A | 11/2018 |
| CN | 109657554 A | 4/2019 |
| EP | 3324333 A2 * | 5/2018 |
| WO | WO 2017043945 A1 | 3/2017 |

OTHER PUBLICATIONS

Tencent Technology, IPRP, PCT/CN2019/116515, May 25, 2021, 6 pgs.

Tencent Technology, ISR, PCT/CN2019/116515, Jan. 31, 2020, 2 pgs.

Dimitrios Kollias et al., "Generating Faces for Affect Analysis", Arxiv.Org, Cornell University Library, Nov. 12, 2018, XP081049335, 19 pgs.

Extended European Search Report, Ep19886293.0, Dec. 15, 2021, 11 Pgs.

Feifei Zhang et al., "Facial Expression Recognition in the Wild: A Cycle-Consistent Adversarial Attention Transfer Approach", Oct. 15, 2018, 10 pgs.

Huiyuan Yang et al., "Identity-Adaptive Facial Expression Recognition Through Expression Regeneration Using Conditional Generative Adversarial Networks", 2018 13th IEEE International Conference on Automatic Face & Gesture Recognition, May 15, 2018, XP033354712, 8 pgs.

* cited by examiner

MICROEXPRESSION-BASED IMAGE RECOGNITION METHOD AND APPARATUS, AND RELATED DEVICE

CROSS REFERENCE TO RELATED APPLICATIONS

This application is a continuation application of PCT Patent Application No. PCT/CN2019/116515, entitled "IMAGE RECOGNITION METHOD BASED ON MICRO FACIAL EXPRESSIONS, APPARATUS AND RELATED DEVICE" filed on Nov. 8, 2019, which claims priority to Chinese Patent Application No. 201811392529.7, filed with the State Intellectual Property Office of the People's Republic of China on Nov. 21, 2018, and entitled "MICROEXPRESSION-BASED IMAGE RECOGNITION METHOD AND APPARATUS, AND RELATED DEVICE", all of which are incorporated herein by reference in their entirety.

FIELD OF THE TECHNOLOGY

This application relates to the field of computer technologies, and in particular, to a microexpression-based image recognition method and apparatus, and a related device.

BACKGROUND OF THE DISCLOSURE

Artificial intelligence (AI) is a theory, method, technology, and application system that uses a digital computer or a machine controlled by a digital computer to simulate, extend, and expand human intelligence, perceive the environment, acquire knowledge, and use knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

The AI technology is a comprehensive discipline, covering a wide range of fields, and including both a hardware-level technology and a software-level technology. Basic AI technologies generally include technologies such as sensor, dedicated AI chip, cloud computing, distributed storage, a big data processing technology, operation/interaction system, and mechatronics. AI software technologies mainly includes several major directions such as a computer vision (CV) technology, a speech processing technology, a natural language processing technology, and machine learning/deep learning.

The CV in the CV technology is a science that studies how to use a machine to "see", and furthermore, is machine vision in which a camera and a computer are used for replacing human eyes to perform recognition, tracking, and measurement, and the like on a target, and further perform graphics processing, so that the computer processes the target into an image more suitable for human eyes to observe or an image transmitted to an instrument for detection. As a scientific subject, CV studies related theories and technologies, and attempts to establish an AI system that can obtain information from images or multi-dimensional data. The CV technologies usually include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, or map construction, and further include biological feature recognition technologies such as common face recognition and fingerprint recognition.

At any place and at any time in life, people have various different emotions. The emotions are closely related to expressions: the expressions are external expression of the emotions, and the emotions are inner experience of the expressions. A microexpression in the expressions is an imperceptible facial expression that is involuntarily shown when a person tries to hide a real emotion inside. The microexpression usually appears when the person intends to conceal something. Compared with a general facial expression, the microexpression is mostly characterized by a short duration and a low intensity, which reflects the real emotion that the person tries to suppress and hide, and is an effective nonverbal cue. Especially when the person intends to conceal psychological changes, it is easier to perform corresponding actions. Therefore, recognition of the microexpression may be applied to the fields of security, criminal investigation, psychology, and the like that requires exploring true thoughts of a person, to crack concealed intention of the person.

In the existing technology, a method for recognizing a microexpression image is mainly to extract a feature of the microexpression image, and then perform classification and recognition based on the extracted feature. However, because the microexpression has the characteristics of a low expression intensity and quickness of an action behavior, even different types of microexpression images are very similar. Consequently, the extracted feature is not very distinguishable, resulting in reduction of accuracy in recognition of the microexpression image.

SUMMARY

Embodiments of this application provide a microexpression-based image recognition method and apparatus, and a related device, which can improve accuracy in microexpression image recognition.

An aspect of the embodiments of this application provides a microexpression-based image recognition method, performed by an electronic device, the method including:

inputting an original expression image belonging to a first expression type into an image augmentation model, the original expression image belonging to the first expression type being an image comprising a microexpression of a person, the image augmentation model being obtained by training with a sample expression image belonging to the first expression type and a sample expression image belonging to a second expression type, and an expression intensity of the sample expression image belonging to the second expression type being greater than an expression intensity of the sample expression image belonging to the first expression type;

augmenting, in the image augmentation model, an expression feature of the microexpression of the person in the original expression image, to obtain a target expression image belonging to the second expression type; and recognizing an expression attribute type corresponding to the target expression image, and determining the expression attribute type corresponding to the target expression image as an expression attribute type corresponding to the original expression image.

An aspect of the embodiments of this application provides a microexpression-based image recognition apparatus, including:

a first obtaining module, configured to input an original expression image belonging to a first expression type into an image augmentation model, the original expression image belonging to the first expression type being an image comprising a microexpression of a person, the image augmentation model being obtained by training with a sample expression image belonging to the first expression type and a sample expression image belonging to a second expression type, and an expression intensity of the sample expression image belonging to the second expression type being greater than an expression intensity of the sample expression image belonging to the first expression type;

an augmenting module, configured to augment, in the image augmentation model, an expression feature of the microexpression of the person in the original expression image, to obtain a target expression image belonging to the second expression type;

a recognition module, configured to recognize an expression attribute type corresponding to the target expression image; and a determining module, configured to determine the expression attribute type corresponding to the target expression image as an expression attribute type corresponding to the original expression image.

An aspect of the embodiments of this application provides an electronic device, including: a processor and a memory, the processor being connected to the memory, the memory being configured to store program code, and the processor being configured to invoke the program code to perform the method in the embodiments of this application.

An aspect of the embodiments of this application provides a computer storage medium, storing a computer program, the computer program including program instructions, the program instructions, when executed by a processor, implementing the method in the embodiments of this application.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of this application, and a person of ordinary skill in the art may still derive other drawings from these accompanying drawings without creative efforts.

DESCRIPTION OF EMBODIMENTS

The technical solutions in embodiments of this application are clearly and completely described in the following with reference to the accompanying drawings in the embodiments of this application. Apparently, the embodiments to be described are merely some rather than all of the embodiments of this application. All other embodiments obtained by a person of ordinary skill in the art based on the embodiments of this application without creative efforts shall fall within the protection scope of this application.

With the research and progress of AI technologies, the AI technologies have been researched and applied in many fields such as common smart home, smart wearable device, virtual assistant, smart speaker, smart marketing, unmanned driving, automatic driving, unmanned aerial vehicle, robot, smart medical care, smart customer service, and speech recognition. It is believed that with the development of technology, the AI technologies will be applied in more fields and play an increasingly important role.

Figure 1:
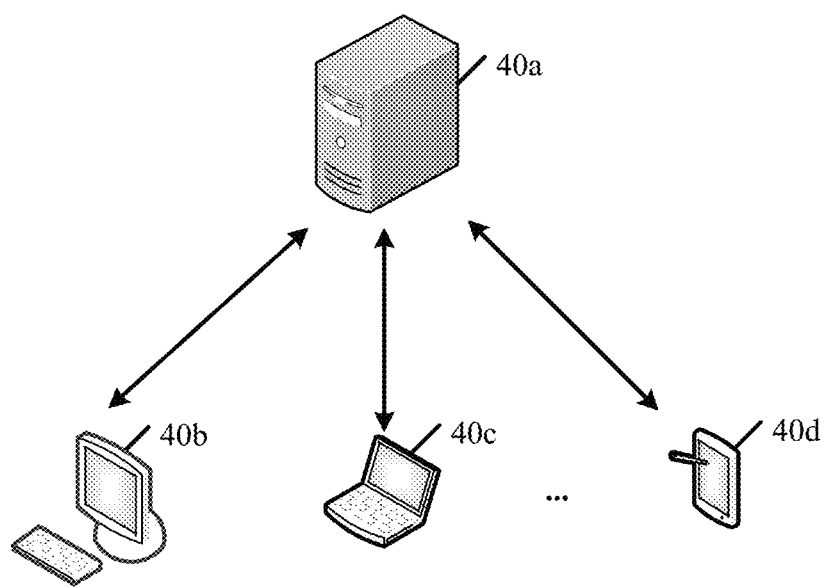
FIG. 1 is a system architecture diagram of a microexpression-based image recognition method according to an embodiment of this application.

FIG. 1 is a system architecture diagram of a microexpression-based image recognition method according to an embodiment of this application. A server 40a provides services for a user terminal cluster, and the user terminal cluster may include: a user terminal 40b, a user terminal 40c, . . . , and a user terminal 40d. When the user terminal (which may be the user terminal 40b, the user terminal 40c, or the user terminal 40d) obtains a microexpression image and needs to recognize an attribute type of the microexpression image, the microexpression image is sent to the server 40a. The server 40a augments an expression feature of a microexpression in the microexpression image based on a pre-trained image augmentation model, to convert the microexpression image into an exaggerated expression image with strong emotional expressiveness. The server 40a then recognizes an attribute type of the exaggerated expression image based on a pre-trained image recognition model, and the recognized attribute type is the attribute type of the microexpression image sent by the user terminal. Subsequently, the server 40a may send the recognized attribute type to the user terminal, and store the microexpression image and the recognized attribute type in a database in association with each other. After receiving the attribute type sent by the server, the user terminal may display the attribute type in text on a screen. Certainly, if a trained image augmentation model and a trained image recognition model are stored locally in the user terminal, a microexpression image may be converted into an exaggerated expression image locally in the user terminal, and then the exaggerated expression image may be recognized. Similarly, a recognized attribute type is used as an attribute type corresponding to the microexpression image. Since training the image augmentation model and training the image recognition model involve a large amount of offline calculation, the local image augmentation model and the local image recognition model of the user terminal may be sent to the user terminal after being trained by the server 40a. A description is made below by using recognition of an attribute type of a microexpression image (which may be recognized in the server 40a or in the user terminal) as an example.

The user terminal may include a mobile phone, a tablet computer, a notebook computer, a palmtop computer, a smart speaker, a mobile Internet device (MID), a point of sale (POS) machine, a wearable device (for example, a smart watch or a smart bracelet), and the like.

Figure 2:
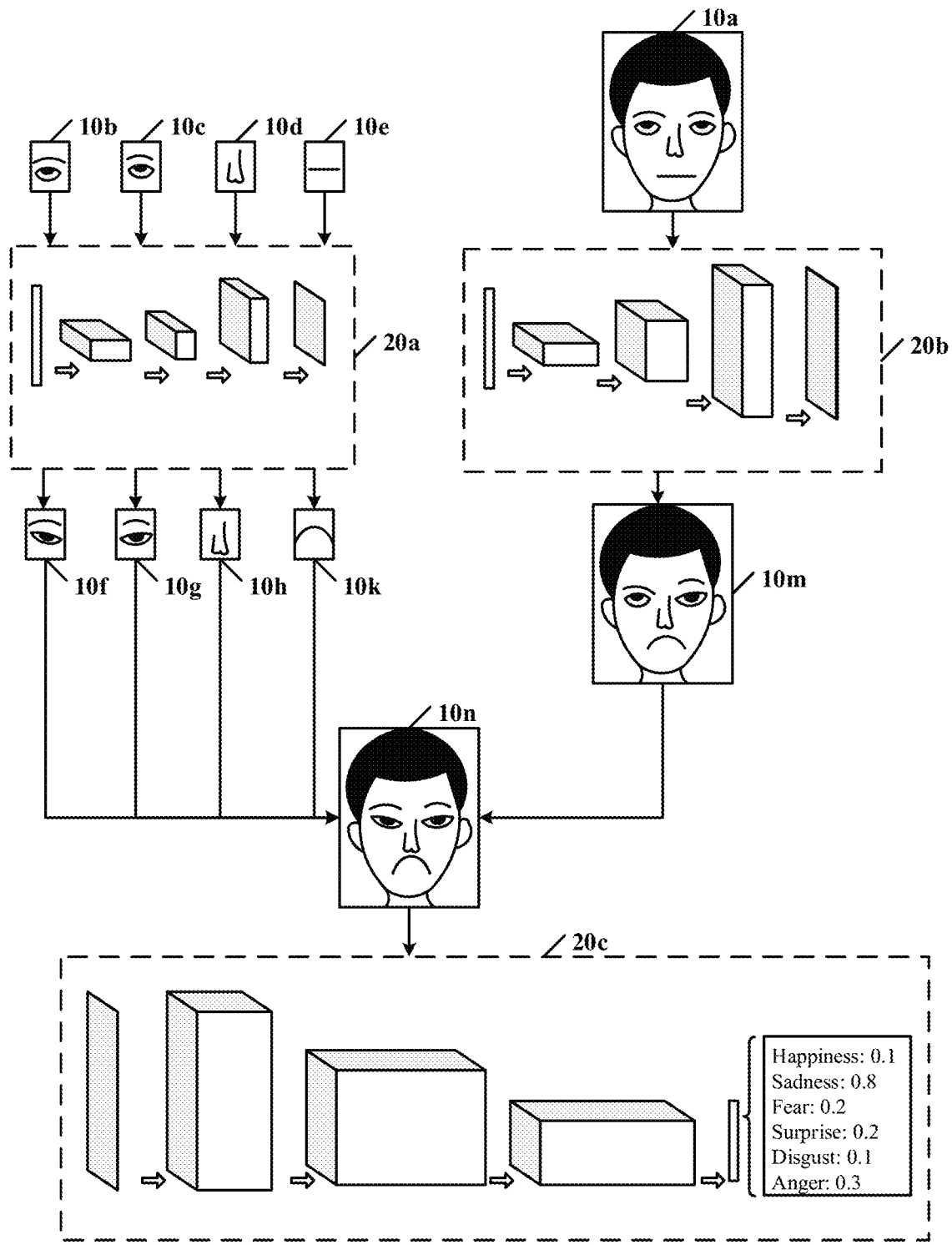
FIG. 2 is a schematic diagram of a scenario of a microexpression-based image recognition method according to an embodiment of this application.

FIG. 2 is a schematic diagram of a scenario of a microexpression-based image recognition method according to an embodiment of this application. A to-be-recognized microexpression image 10a is obtained, and a microexpression is an expression with a short duration, a low emotional expression intensity, and an inconspicuous distinguishing feature. Since a facial expression is mainly formed by facial parts, images belonging to areas of facial parts are extracted from the microexpression image 10a. That is, an image 10b (an image located in a left eye area in the microexpression image 10a), an image 10c (an image located in a right eye area in the microexpression image 10a), an image 10d (an image located in a nose area in the microexpression image 10a), and an image 10e (an image located in a mouth area in the microexpression image 10a) are extracted from the microexpression image 10a. The image 10b is inputted into an image augmentation model 20a. The image augmentation model 20a is configured to augment an expression feature of an image. The augmenting an expression feature is to adjust shapes of facial parts, for example, outwardly open eyes, raise eyelids, frown inward, open corners of the mouth, showing teeth, make corners of the lips downward. An expression feature of the image 10b is augmented in the image augmentation model 20a to obtain an image 10f. Similarly, the image 10c is inputted into the image augmentation model 20a, and an expression feature of the image 10c is augmented in the image augmentation model 20a to obtain an image 10g. The image 10d is inputted into the image augmentation model 20a, and an expression feature of the image 10d is augmented in the image augmentation model 20a to obtain an image 10h. The image 10e is inputted into the image augmentation model 20a, and an expression feature of the image 10e is augmented in the image augmentation model 20a to obtain an image 10k.

The following describes how to augment the expression feature of the image 10b in the image augmentation model 20a by using the image 10b as an example. After the remaining images are inputted into the augmentation model 20a, the expression features of the images may be augmented in the same manner. The image 10b is inputted into an input layer of the image augmentation model 20a to convert the image 10b into a corresponding matrix, random sampling is performed in the matrix, and sampled data is combined into a column vector. The column vector herein may be a column vector with a size of 1*n. Deconvolution processing is performed on the 1*n column vector according to a transposed convolution layer in the image augmentation model 20a. The deconvolution processing is an inverse operation of convolution processing. A specific process is to fully connect and reshape the column vector into a four-dimensional tensor 1*1*1*n, then project the four-dimensional tensor to a small space range with a plurality of feature mappings for convolution, and obtain, through a series of fractionally-strided convolutions, an advanced representation vector 1*p*p*3 that can represent the image 10b. If an augmented image needs to be a color image, a $0^{th}$ index dimension of the advanced representation vector is compressed to obtain a color image with a size of p*p. If the augmented image needs to be a grayscale image, the $0^{th}$ index dimension and the third index dimension of the advanced representation vector are compressed to obtain a grayscale image with a size of p*p. For example, an image outputted from the image augmentation model 20a is a grayscale image. The $0^{th}$ index dimension and the third index dimension are compressed to obtain the image 10f. That is, the image 10f outputted from the image augmentation model is an image obtained after the expression feature of the image 10b is augmented.

The image augmentation model 20a may also be understood as an inverse process in which an attribute type of an object in an image is recognized based on a convolutional neural network. That the convolutional neural network recognizes an image is that an image is inputted and a column vector is outputted, and the column vector represents matching degrees between the inputted image and a plurality of attribute types. However, the image augmentation model obtains a column vector after performing random sampling on an image. That is, a column vector is inputted into the image augmentation model 20a, and an image is outputted from the image augmentation model 20a. The image augmentation model 20a may correspond to a generative model in an adversarial network. The adversarial network includes a generative model and a discriminative model, and the generative model is configured to generate simulated sample data. In this application, the generative model (the image augmentation model) is configured to generate an exaggerated expression image with a stronger emotional expressivity. The discriminative model is configured to determine a probability that the exaggerated expression image generated by the generative model is a real image. An image belonging to a real expression type is a real image, and correspondingly, an image belonging to a simulated expression type is a simulated image (or may be referred to as a simulation image). The real image is a normal face image acquired by an image acquirer, and the simulated image is an image created by the model. For example, an image obtained by shooting a facial expression by a camera is a real image belonging to the real expression type.

The complete microexpression image 10a is then inputted into an image augmentation model 20b, and an expression feature of a microexpression in the microexpression image 10a is augmented in the image augmentation model 20b to obtain an image 10m with an augmented expression feature. Compared with the microexpression image 10a, the image 10m with the augmented expression feature has higher expression recognizability and a higher expression intensity. Since the image augmentation model 20b and the image augmentation model 20a have exactly the same structure, and a difference lies in a value of a parameter in the model, for a specific process of augmenting the expression feature by the image augmentation model 20b, reference may be made to the process of augmenting the expression feature of the image 10b by the image augmentation model 20a.

There is no chronological order limitation between augmenting the image 10b, the image 10c, the image 10d, and the image 10e by using the image augmentation model 20a and augmenting the microexpression image 10a by using the image augmentation model 20b. That is, the image 10b, the image 10c, the image 10d, and the image 10e may first be augmented based on the image augmentation model 20a, or the microexpression image 10a may first be augmented based on the image augmentation model 20b, or the two image augmentation models augment the expression features of the images in parallel.

After the image 10f, the image 10g, the image 10h, the image 10k, and the image 10m after the expression features are augmented are determined, the image 10f, the image 10g, the image 10h, the image 10k, and the image 10m are combined into one image 10n according to location information of the corresponding image 10*b*, image 10*c*, image 10*d*, and image 10*e* in the microexpression image 10*a*. Since the image 10*n* is a combination of a plurality of exaggerated expression images, the image 10*n* is also an image with high emotional expressiveness and high expression recognizability. That is, the image 10*n* is an exaggerated expression image compared with the microexpression image 10*a*.

The exaggerated expression image 10*n* is inputted into an image recognition model 20*c*. The image recognition model 20*c* is configured to recognize expression attribute types corresponding to expressions in the image 10*n*, and the expression attribute types may include happiness, sadness, fear, surprise, disgust, anger, and the like. The image recognition model 20*c* may be a convolutional neural network model, and a recognition process is specifically that: the image 10*n* is inputted into an input layer in the image recognition model 20*c*, static structure feature information corresponding to the image 10*n* is extracted through a convolution operation of a convolution layer and a pooling operation of a pooling layer in the image recognition model 20*c*, and probabilities that the static structure feature information corresponding to the image 10*n* matches six expression attribute type features included in the image recognition model are calculated by using a classifier in the image recognition model 20*c*. The probabilities are respectively: 0.1 happiness, 0.8 sadness, 0.2 fear, 0.2 surprise, 0.1 disgust, and 0.3 anger, and the values in the matching result represents the probabilities that the static structure feature information of the image 10*n* matches the six expression attribute type features. For example, "0.1 happiness" represents that the probability that the static structure feature information of the image 10*n* matches the expression attribute type feature "happiness" is 0.1. From the matching result, an expression attribute type corresponding to the expression attribute type feature with a highest matching probability is used as an expression attribute type corresponding to the image 10*n*. Since the image 10*n* is obtained by augmenting the expression feature of the microexpression image 10*a*, the recognized expression attribute type of the image 10*n* is the expression attribute type corresponding to the microexpression image 10*a*. Therefore, according to the results of the six matching probabilities, it may be determined that the expression attribute type corresponding to the image 10*n* is: sadness (0.8 sadness>0.3 anger>0.2 surprise=0.2 fear>0.1 happiness=0.1 disgust). Then the expression attribute type corresponding to the microexpression image 10*a* is also: sadness. It can be learned from above that the image augmentation model 20*a* and the image augmentation model 20*b* not only may augment an expression feature of a microexpression image or a microexpression sub-image, so that the microexpression image may be converted into an exaggerated expression image, but also can ensure that an expression attribute type of the exaggerated expression image recognized by the image recognition model 20*c* is the same as an expression attribute type of the microexpression image. That is, the converted exaggerated expression image not only is exaggerated (with a higher expression intensity) and real, but also ensures that the expression attribute type is consistent with the expression attribute type of the microexpression image.

If it is subsequently determined that the expression attribute type of the microexpression image 10*a* is the same as a preset expression attribute type, and a probability corresponding to the expression attribute type is greater than a preset probability threshold, a terminal may perform a corresponding operation. For example, if a recognized expression attribute type is sadness, and a probability corresponding to the expression attribute type "sadness" is greater than or equal to 0.8, the terminal performs a payment operation or performs a photographing operation.

An expression feature of a microexpression in a microexpression image is augmented by using an image augmentation model, so that the microexpression image is converted into a target expression image with high recognizability, an expression attribute type of the target expression image is recognized by using an expression distinguishing feature of the target expression image, and is used as an expression attribute type of the microexpression image. Since the expression feature of the target expression image is distinguishable, the expression attribute type of the target expression image can be accurately recognized, to improve accuracy of recognizing the microexpression image.

For a specific process of augmenting the expression feature based on the image augmentation model and recognizing the expression attribute type corresponding to the image, reference may be made to the following embodiments corresponding to FIG. 3 to FIG. 7.

Figure 3:
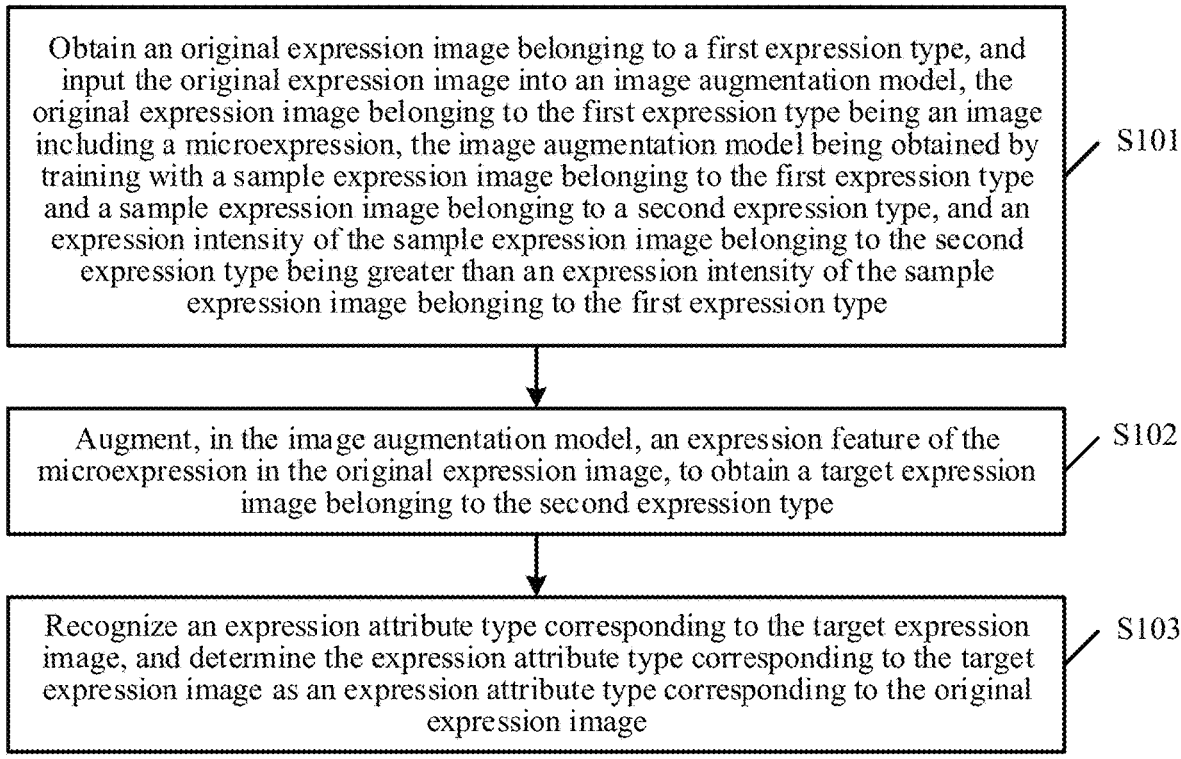
FIG. 3 is a schematic flowchart of a microexpression-based image recognition method according to an embodiment of this application.

Further, FIG. 3 is a schematic flowchart of a microexpression-based image recognition method according to an embodiment of this application. As shown in FIG. 3, the microexpression-based image recognition method may include the following steps.

Step S101. Obtain an original expression image belonging to a first expression type, and input the original expression image into an image augmentation model, the original expression image belonging to the first expression type being an image including a microexpression, the image augmentation model being obtained by training with a sample expression image belonging to the first expression type and a sample expression image belonging to a second expression type, and an expression intensity of the sample expression image belonging to the second expression type being greater than an expression intensity of the sample expression image belonging to the first expression type.

Specifically, a to-be-recognized or to-be-classified image (for example, the microexpression image 10*a* in the embodiment corresponding to FIG. 2) belonging to the first expression type is obtained, and is referred to as the original expression image belonging to the first expression type, the image belonging to the first expression type is an image including a microexpression, and the microexpression is a short-lived facial expression with a low expression intensity that is made unconsciously when a person tries to hide an emotion. Then, correspondingly, an image belonging to the second expression type is an image including an exaggerated expression (for example, the image 10*n* in the embodiment corresponding to FIG. 2). It may alternatively be understood as that: an expression intensity and expression distinction that correspond to the image belonging to the second expression type are much greater than that of the image belonging to the first expression type, and an image with a high expression intensity refers to an image with obvious facial emotional expression and exaggerated shapes of facial parts, for example, an expression intensity of laughing happily is much greater than that of expressionless. To recognize the expression attribute type corresponding to the original expression image, as the original expression image is an image belonging to the first expression type without feature distinction, the original expression image is inputted into the image augmentation model (for example, the image augmentation model 20*a* and the image augmentation model 20*b* in the embodiment corresponding to FIG. 2), to augment the expression feature of the microexpression in the original expression image. The image augmentation model is obtained by training an adversarial network with the sample expression image belonging to the first expression type and the sample expression image belonging to the second expression type, and the image augmentation model corresponds to a generative model in the adversarial network.

Step S102. Augment, in the image augmentation model, an expression feature of the microexpression in the original expression image, to obtain a target expression image belonging to the second expression type.

Specifically, in the image augmentation model, the expression feature of the microexpression in the original expression image is augmented. Because a facial expression is formed by eyes, eyebrows, a nose, a mouth, a forehead, cheeks, and a lower jaw of facial parts, the augmenting an expression feature is to adjust external shapes of the eyes, the eyebrows, the nose, the mouth, the forehead, the cheeks, and the lower jaw, to augment an emotional expressivity of the facial expression, for example, opening the eyes, raising the eyebrows, pulling down the corners of the mouth, opening nostrils, raising and wrinkling the cheeks, wrinkling the forehead, and tightening the lower jaw. It can be learned that after the expression feature is augmented, the obtained image has a relatively high expression intensity and obvious expression distinction. Therefore, an image obtained after the expression feature of the original expression image is augmented is the image belonging to the second expression type, and is referred to as the target expression image belonging to the second expression type.

Since the facial expression is mainly formed by changes of the eyes, the eyebrows, the nose, and the mouth in the facial parts, to convert the original expression image (the microexpression image) into the target expression image (the exaggerated expression image) with a high expression intensity, the target augmentation model may include two sub-models, respectively, a first augmentation sub-model (for example, the image augmentation model 20a in the embodiment corresponding to FIG. 2) and a second augmentation sub-model (for example, the image augmentation model 20b in the embodiment corresponding to FIG. 2). The first augmentation sub-model is configured to augment expression features of the eyes, the eyebrows, the nose, and the mouth in the facial expression, and the second augmentation sub-model is configured to augment an expression feature of an entire microexpression. The expression images respectively augmented by the two augmentation sub-models are then combined into the target expression image.

A specific process of augmenting the original expression image based on the first augmentation sub-model and the second augmentation sub-model to obtain the target expression image is that: an expression identification area is determined in the original expression image, and the determined expression identification area is extracted from the original expression image as a unit original expression image (for example, the image 10b, the image 10c, the image 10d, and the image 10e in the embodiment corresponding to FIG. 2). The expression identification area is an area in which the eyes, the eyebrows, the nose, or the mouth in the facial expression is located. It can be learned that there are a plurality of unit original expression images herein. The unit original expression images are separately inputted into the first augmentation sub-model, expression features of the unit original expression images are separately augmented in the first augmentation sub-model, and all obtained images are referred to as unit auxiliary images (for example, the image 10f, the image 10g, the image 10h, and the image 10k in the embodiment corresponding to FIG. 2). It can be learned that a quantity of the unit auxiliary images and a quantity of the unit original expression images are the same, and each unit auxiliary image has a unique corresponding unit original expression image.

The original expression image is then inputted into the second augmentation sub-model, an expression feature of the original expression image is augmented in the second augmentation sub-model, and an image obtained after an expression is augmented is referred to as a target auxiliary image.

An execution sequence between obtaining the unit auxiliary image based on the first augmentation sub-model and obtaining the target auxiliary image based on the second augmentation sub-model is not limited. After the unit auxiliary image and the target auxiliary image are determined, since the unit auxiliary image and the unit original expression image are in one-to-one correspondence, the unit auxiliary image and the target auxiliary image are combined into the target expression image according to location information of the unit original expression image in the original expression image, and the target expression image is an image with a high expression intensity.

Binarization processing is performed on the original expression image, an image obtained after the binarization processing is performed is referred to as a binary image, and a pixel value of a pixel in the binary image is 1 or 0. The binarization processing is to set a value of a pixel, of which the pixel value is greater than a pixel threshold, in the original expression image to 1, and correspondingly set a value of a pixel, of which the pixel value is less than or equal to the pixel threshold, in the original expression image to 0. The pixel value of the original expression image herein has been normalized. That is, all the pixel values of the original expression image range from 0 to 1. In terms of a display effect, if a pixel value is equal to 1, the pixel value is displayed in white; and if a pixel value is equal to 0, the pixel value is displayed in black. Edge detection is performed on the binary image. The edge detection is to detect an area in which a grayscale changes sharply in the binary image, and a change of the grayscale of the image may be reflected by using a gradient of grayscale distribution. Therefore, the edge detection may be performed on the binary image based on a gradient operator to obtain a gradient image. The gradient operator may include: a Roberts operator, a Prewitt operator, a Sobel operator, a Laplacian operator, and the like. Since the gradient image is an image reflecting that the grayscale in the binary image changes sharply, the gradient image is an image formed by an edge contour of the original expression image. For a facial expression, the edge contour is contours of the eyes, contours of the eyebrows, a contour of the nose, and a contour of the mouth. Location information (or referred to as target location information) of the edge contour is determined in the gradient image. The target location information may include four pieces of coordinate information. The four pieces of coordinate information indicate four vertex coordinates of a rectangular area, and the rectangular area is a smallest rectangular area including the edge contour. In the original expression image, areas identified by the target location information are areas in which the eyes, the eyebrows, the nose, and the mouth in a facial expression are located. That is, the area identified by the target location information in the original expression image is the expression identification area.

Step S103. Recognize an expression attribute type corresponding to the target expression image, and determine the expression attribute type corresponding to the target expression image as an expression attribute type corresponding to the original expression image.

Specifically, to improve accuracy in subsequent target expression image recognition, the target expression image may be first adjusted to a fixed size, and the target expression image whose size has been adjusted is then inputted into an input layer of an image recognition model (for example, the image recognition model 20c in the embodiment corresponding to FIG. 2). The image recognition model may include an input layer, a convolution layer, a pooling layer, a full connection layer, and an output layer, and a parameter value of the input layer is equal to a size of the target expression image whose size has been adjusted. After the target expression image is inputted to the input layer of the convolutional neural network, the target expression image enters the convolution layer subsequently. First, a small piece of the target expression image is randomly selected as a sample, and some feature information is learned from the small sample, and then the sample is used as a window to sequentially slide across all pixel areas of the target expression image. That is, a convolution operation is performed on the feature information learned from the sample and the target expression image to obtain the most significant feature information at different locations in the target expression image. After the convolution operation is completed, the feature information of the target expression image has been extracted, but a quantity of features extracted only through the convolution operation is large. To reduce a calculation amount, a pooling operation is also required. That is, the feature information extracted from the target expression image through the convolution operation is transmitted to the pooling layer, and the extracted feature information is aggregated for statistics collection. An order of magnitude of the statistical feature information is far lower than an order of magnitude of the feature information extracted through the convolution operation, and a classification effect is improved. Common pooling methods mainly include an average pooling operation method and a maximum pooling operation method. The average pooling operation method is to calculate one piece of average feature information from a feature information set to represent a feature of the feature information set; and the maximum pooling operation is to extract maximum feature information from a feature information set to represent a feature of the feature information set.

Through the convolution processing of the convolution layer and the pooling processing of the pooling layer, static structure feature information of the target expression image may be extracted, and referred to as target structure feature information, and the target structure feature information has a relatively low order of magnitude. There may be only one convolution layer or a plurality of convolution layers in the convolutional neural network, and similarly, there may be only one pooling layer or a plurality of pooling layers.

Matching degrees between the target structure feature information of the target expression image and a plurality of expression attribute type features in the image recognition model are recognized by using a classifier in the image recognition model (corresponding to the full connection layer and the output layer of the image recognition model). The classifier is pre-trained, an input of the classifier is the static structure feature information, and an output of the classifier is matching degrees between the static structure feature information and the plurality of expression attribute type features. A higher matching degree indicates a larger probability that an expression in the target expression image matches an expression attribute type corresponding to an expression attribute type feature, and a quantity of obtained matching degrees is the same as a quantity of the expression attribute type features in the image recognition model. The quantity and types of expression attribute type features included in the image recognition model are determined by a quantity and types of expression attribute types included in a training data set when the image recognition model is trained. An expression attribute type corresponding to an expression attribute type feature corresponding to a maximum matching degree is extracted from the obtained matching degrees with the plurality of expression attribute type features, the extracted expression attribute type is used as the expression attribute type of the target expression image, and the extracted expression attribute type is also the expression attribute type of the original expression image.

For example, there are an expression attribute type feature "happiness", an expression attribute type feature "fear", an expression attribute type feature "anger", and an expression attribute type feature "surprise" in the image recognition model. According to the classifier in the image recognition model, a matching degree between target structure feature information A and the expression attribute type feature "happiness" is recognized as 0.1, a matching degree between the target structure feature information A and the expression attribute type feature "fear" is recognized as 0.3, a matching degree between the target structure feature information A and the expression attribute type feature "anger" is recognized as 0.6, and a matching degree between the target structure feature information A and the expression attribute type feature "surprise" is recognized as 0.9. An expression attribute type corresponding to a maximum matching degree is extracted from the foregoing four matching degrees. That is, an expression attribute type "surprise" corresponding to the maximum matching degree 0.9 is extracted. Therefore, the expression attribute type corresponding to the target expression image is surprise, and the expression attribute type corresponding to the original expression image is also surprise.

Figure 4:
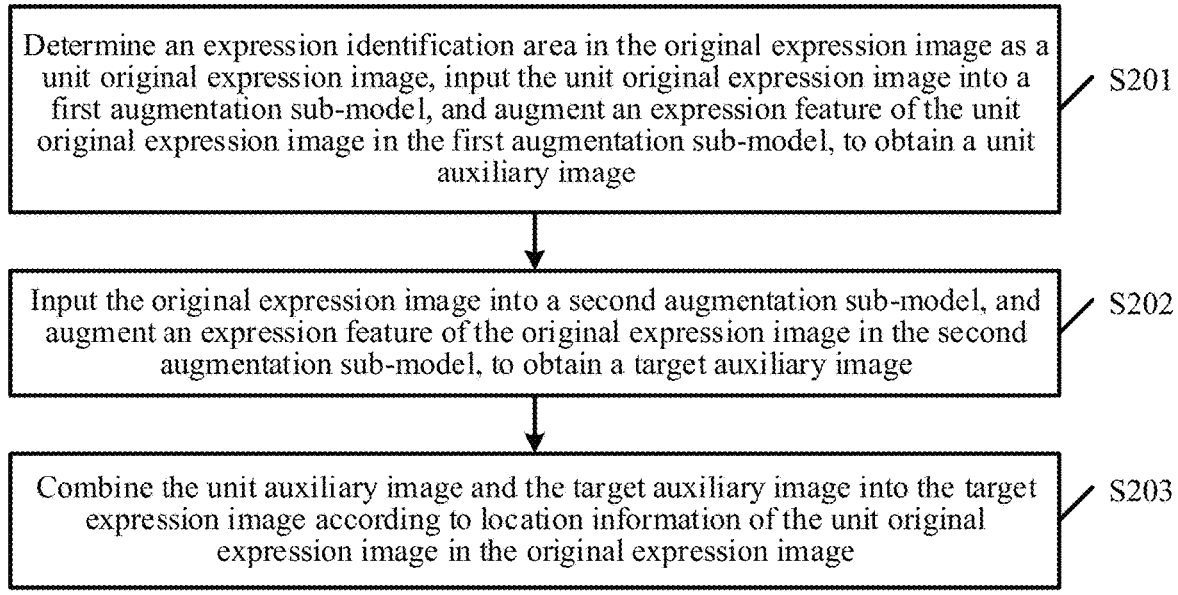
FIG. 4 is a schematic flowchart of augmenting an expression feature according to an embodiment of this application.

Further, FIG. 4 is a schematic flowchart of augmenting an expression feature according to an embodiment of this application. As shown in FIG. 4, a specific process of augmenting the expression feature includes the following steps S201 to S203, and steps S201 to S203 are a specific embodiment of step S102 in the embodiment corresponding to FIG. 3.

Step S201. Determine an expression identification area in the original expression image as a unit original expression image, input the unit original expression image into the first augmentation sub-model, and augment an expression feature of the unit original expression image in the first augmentation sub-model, to obtain a unit auxiliary image.

Specifically, the image augmentation model includes a first augmentation sub-model and a second augmentation sub-model. The expression identification area is determined in the original expression image, and the determined expression identification area is extracted from the original expression image as the unit original expression image. The expression identification area is an area in which the eyes, the eyebrows, the nose, or the mouth in the facial expression is located. An example in which the first augmentation sub-model augments an expression feature of one unit original expression image is used below for description. If there are a plurality of unit original expression images, expression features may be augmented in the same manner to obtain unit auxiliary images after the expression features are augmented.

The unit original expression image is inputted into an input layer of the first augmentation sub-model, to obtain a matrix corresponding to the unit original expression image, which is referred to as a first original matrix. That is, pixel points of the unit original expression image are discretized to obtain the first original matrix having the same size as the unit original expression image. Random sampling is performed in the first original matrix, and sampled values are combined into a column vector 1*n (referred to as a first original vector) with a length of n, and a target length is preset. For example, the target length n may be 100, and a first original vector of 1*100 is obtained by performing down-sampling in the first original matrix. To input the first original vector into a transposed convolution layer in the first augmentation sub-model, the first original vector needs to be first expanded into a four-dimensional tensor of 1*1*1*n. Deconvolution processing is performed on the four-dimensional tensor based on a first transposed convolution layer in the first augmentation sub-model to obtain a tensor corresponding to the first transposed convolution layer. The deconvolution processing and the convolution processing are opposite to each other in operation, and a space changes from small to large. After the deconvolution processing is performed on the tensor corresponding to the first transposed convolution layer by using a second transposed convolution layer in the first augmentation sub-model, a tensor corresponding to the second transposed convolution layer is obtained, . . . , until the deconvolution processing is performed based on the last transposed convolution layer in the first augmentation sub-model, a four-dimensional tensor with a size of 1*a*b*3 may be obtained. After a $0^{th}$ index dimension and a third index dimension are compressed, a two-dimensional tensor a*b is obtained, and is referred to as a first target tensor. The first target tensor is determined as a unit auxiliary image, and a size of the unit auxiliary image is equal to a*b. After the four-dimensional tensor with the size of 1*a*b*3 is determined, the unit auxiliary image obtained by compressing the $0^{th}$ index dimension and the third index dimension is a grayscale image. If the unit auxiliary image obtained by compressing the $0^{th}$ index dimension is a color image with a size of a*b, a first target tensor corresponding to the color image is a three-dimensional tensor a*b*3. Since the unit auxiliary images need to be combined subsequently, the size of the unit auxiliary image and the size of the unit original expression image are the same.

For a plurality of unit original expression images, the expression features may all be augmented in the foregoing manner, to obtain unit auxiliary images respectively corresponding to the unit original expression images.

Step S202. Input the original expression image into the second augmentation sub-model, and augment an expression feature of the original expression image in the second augmentation sub-model, to obtain a target auxiliary image.

The original expression image is inputted into an input layer of the second augmentation sub-model, to obtain a matrix corresponding to the original expression image, which is referred to as a second original matrix. That is, pixel points of the original expression image are discretized to obtain the second original matrix having the same size as the original expression image. Random sampling is performed in the second original matrix, and sampled values are combined into a column vector 1*m (referred to as a second original vector) with a length of m. To input the second original vector into a transposed convolution layer in the second augmentation sub-model, the second original vector needs to be first expanded into a four-dimensional tensor of 1*1*1*m. Deconvolution processing is performed on the four-dimensional tensor based on a first transposed convolution layer in the second augmentation sub-model to obtain a tensor corresponding to the first transposed convolution layer. The deconvolution processing and the convolution processing are opposite to each other in operation, and a space changes from small to large. After the deconvolution processing is performed on the tensor corresponding to the first transposed convolution layer by using a second transposed convolution layer in the second augmentation sub-model, a tensor corresponding to the second transposed convolution layer is obtained, . . . , until the deconvolution processing is performed based on the last transposed convolution layer in the second augmentation sub-model, a four-dimensional tensor with a size of 1*c*d*3 may be obtained. Similarly, after a $0^{th}$ index dimension and a third index dimension are compressed, a two-dimensional tensor c*d is obtained, and is referred to as a second target tensor. The second target tensor is determined as a target auxiliary image, and a size of the target auxiliary image is equal to c*d. Similarly, After the four-dimensional tensor with the size of 1*c*d*3 is determined, if the target auxiliary image obtained by compressing the $0^{th}$ index dimension and the third index dimension is a grayscale image, and the target auxiliary image obtained by compressing the $0^{th}$ index dimension is a color image with a size of c*d, a second target tensor corresponding to the color image is a three-dimensional tensor c*d*3. It can be learned from above that the first augmentation sub-model and the second augmentation sub-model have the same structure, but model parameters (for example, convolution kernels of the transposed convolution layers and a quantity of the transposed convolution layers) are inconsistent, and the size of the target auxiliary image is the same as the size of the original expression image.

Step S203. Combine the unit auxiliary image and the target auxiliary image into the target expression image according to location information of the unit original expression image in the original expression image.

Since the unit auxiliary image and the unit original expression image are in one-to-one correspondence, and the size of the unit auxiliary image and the size of the unit original expression image are the same, the unit auxiliary image and the target auxiliary image are combined into the target expression image according to the location information of the unit original expression image in the original expression image. The location information refers to location coordinates of the corresponding unit original expression image in the original expression image, and the size of the target expression image obtained through combination is also the same as the size of the original expression image.

It can be learned from above that an expression feature of a microexpression in a microexpression image is augmented by using an image augmentation model, so that the microexpression image is converted into a target expression image with high recognizability, and an expression attribute type of the target expression image is recognized by using an expression distinguishing feature of the target expression image, and is used as an expression attribute type of the microexpression image. Since the expression feature of the target expression image is distinguishable, the expression attribute type of the target expression image can be accurately recognized, to improve accuracy of recognizing the microexpression image.

Figure 5:
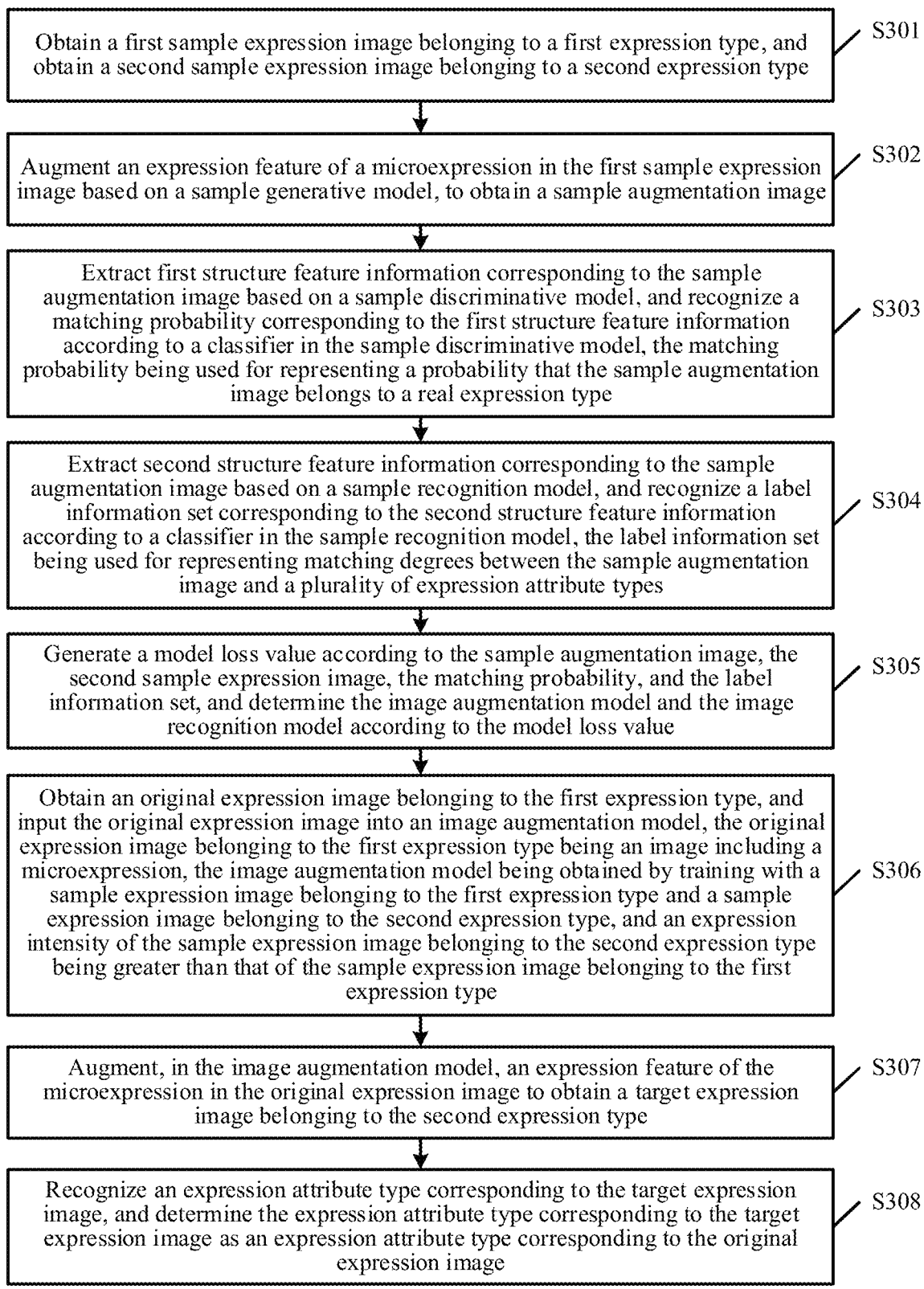
FIG. 5 is a schematic flowchart of another microexpression-based image recognition method according to an embodiment of this application.

FIG. 5 is a schematic flowchart of another microexpression-based image recognition method according to an embodiment of this application. A specific process of the microexpression-based image recognition method is as follows.

Step S301. Obtain a first sample expression image belonging to a first expression type, and obtain a second sample expression image belonging to a second expression type.

Specifically, to train the image augmentation model and the image recognition model, the first sample expression image belonging to the first expression type is obtained, and the second sample expression image belonging to the second expression type is obtained. An expression in the first sample expression image is a microexpression, and an expression in the second sample expression image is an exaggerated expression. A description is made below by using one first sample expression image and one second sample expression image as an example.

The following steps S302 to S305 are used for describing a process of training an image augmentation model and an image recognition model. Steps S306 to S308 are used for describing a process of recognizing an image including a microexpression. The image augmentation model is configured to augment an expression feature of an image, or it may be understood as that: an image with higher expression recognizability and a stronger expression intensity is generated by using the image augmentation model. Therefore, the image augmentation model may correspond to a sample generative model in an adversarial network, and the adversarial network includes the sample generative model and a sample discriminative model. The sample generative model is configured to generate sample data, herein is to generate an expression image with a high expression intensity, and the sample discriminative model is configured to determine a probability that the sample data is a real expression image and a probability that the sample data is a simulated expression image (the sample data generated by the sample generative model is simulated sample data, an image acquired by a data acquirer is real sample data, and a sum of the probability that the sample data is a real expression image and the probability that the sample data is a simulated expression image is 1). Therefore, training the image augmentation model is essentially to train the adversarial network, and both the sample generative model and the sample discriminative model need to be trained. The adversarial network may alternatively be understood as that: the sample generative model needs to generate a real and exaggerated expression image as much as possible, and the sample discriminative model needs to recognize that an image generated by the sample generative model is a simulation image of the model rather than an actually acquired expression image, so this is a process of an adversarial game (also referred to as the adversarial network). Therefore, the training process is to find a balance between authenticity corresponding to the sample generative model and accuracy corresponding to the sample discriminative model. A target function of the adversarial network may be expressed as formula (1):

$$\min_T \max_D E[\log D(z)] + E[\log(1 - D(T(x)))] \quad (1)$$

where x represents the first sample expression image belonging to the first expression type, z represents the second sample expression image belonging to the second expression type, T represents the sample generative model, which is configured to augment an expression feature of a microexpression image, and T(x) represents an image with an augmented expression. D represents the sample discriminative model, which is configured to recognize a probability that an object (the object herein includes the second sample expression image or the image obtained after the expression feature is augmented) belongs to a real expression type, and the image belonging to the real expression type herein refers to an image about a facial expression acquired by using an image acquirer. A simulated expression type corresponds to the real expression type, and an image belonging to the simulated expression type is a fake expression image generated by the model.

Maximizing D means that for the sample discriminative model, when the second sample expression image (the second sample expression image is a real and exaggerated expression image) is inputted, a recognized label of the second sample expression image that is expected to be recognized is 1 (the recognized label being 1 indicates that a probability that a corresponding image belongs to a normal expression image type is 1). Therefore, a larger D(z) is better. When the image obtained after the expression feature is augmented is inputted, a recognized label of the image that is obtained after the expression feature is augmented and that is expected to be recognized is 0 (the recognized label being 0 indicates that a probability that a corresponding image belongs to a normal expression image type is 0, and this is because a sample augmentation image is an image generated by the model rather than an actually acquired image). That is, a smaller D(T(x)) is better. Therefore, when the second term is changed to 1−D(T(x)), a larger 1−D(T(x)) is better. For D(z) and 1−D(T(x)) as a whole, the larger, the better.

Minimizing T means that for the sample generative model, when the sample augmentation image is inputted, a recognized label of the sample augmentation image that is expected to be recognized is 1 (because the sample generative model expects that the sample augmentation image is sufficiently real and vivid, it is expected that the recognized label of the sample augmentation image recognized through the sample discriminative model is 1). Therefore, a larger D(T(x)) is better. To uniformly write in the form of D(T(x)), 1−D(T(x)) is minimized correspondingly.

Step S302. Augment an expression feature of a microexpression in the first sample expression image based on a sample generative model, to obtain a sample augmentation image.

Specifically, a sample generative model is initialized, and the expression feature of the microexpression in the first sample expression image is augmented based on the sample generative model to obtain the sample augmentation image. For a specific augmentation process, reference may be made to steps S201 to S203 in the embodiment corresponding to FIG. 4. Since the sample generative model has not been trained yet in this case, quality of the sample augmentation image may be relatively low (that is, the sample augmentation image is not vivid, is low in an expression intensity and not exaggerated, or even is not an expression image), and the sample generative model before training or the sample generative model after training (that is, the image augmentation model) has the same structure, and a difference lies in a value of a parameter in the model.

Step S303. Extract first structure feature information corresponding to the sample augmentation image based on the sample discriminative model, and recognize a matching probability corresponding to the first structure feature information according to a classifier in the sample discriminative model, the matching probability being used for representing a probability that the sample augmentation image belongs to a real expression type.

Specifically, after the sample augmentation image generated by the sample generative model is obtained, a sample discriminative model is initialized, and the sample discriminative model may be a classification model based on a convolutional neural network. Structure feature information (referred to as the first structure feature information) corresponding to the sample augmentation image is extracted based on the sample discriminative model, and the matching probability that the sample augmentation image belongs to the real expression type is recognized according to the classifier in the sample discriminative model and the first structure feature information. Herein, an image belonging to the real expression type refers to a real and normal facial expression image acquired by an image acquirer (for example. a camera). Certainly, if a generated sample augmentation image is more vivid, a corresponding matching probability is higher. The matching probability calculated by the sample discriminative model can only determine a probability that the sample augmentation image shows a real and normal facial expression.

Step S304. Extract second structure feature information corresponding to the sample augmentation image based on a sample recognition model, and recognize a label information set corresponding to the second structure feature information according to a classifier in the sample recognition model, the label information set being used for representing matching degrees between the sample augmentation image and a plurality of expression attribute types.

Specifically, after the sample augmentation image generated by the sample generative model is obtained, a sample recognition model is initialized, and the sample recognition model may be a classification model based on a convolutional neural network. Structure feature information (referred to as the second structure feature information) corresponding to the sample augmentation image is extracted based on the sample recognition model, and matching degrees between the sample augmentation image and a plurality of expression attribute types are recognized according to the classifier in the sample recognition model and the second structure feature information. A plurality of matching degrees are associated with corresponding expression attribute types to obtain a plurality of pieces of label information, and the plurality of pieces of label information are combined into the label information set.

For example, a matching degree between a sample augmentation image A and an expression attribute type "happiness" is 0.2, a matching degree between the sample augmentation image A and an expression attribute type "sadness" is 0.1, a matching degree between the sample augmentation image A and an expression attribute type "fear" is 0.7, and then the matching degrees are associated with the corresponding expression attribute types, that is, a label information set is obtained: 0.2-happiness, 0.1-sadness, and 0.7-fear.

It can be learned from above that although both the sample discriminative model and the sample recognition model may be classification models based on the convolutional neural network, the first structure feature information extracted by the sample discriminative model is mainly hidden advanced feature information reflecting whether the sample augmentation image is a real image or a simulated image, and the second structure feature information extracted by the sample recognition model is mainly hidden advanced feature information reflecting an attribute type of the sample augmentation image.

Step S305. Generate a model loss value according to the sample augmentation image, the second sample expression image, the matching probability, and the label information set, and determine the image augmentation model and the image recognition model according to the model loss value.

Specifically, a generative loss value is generated according to the sample augmentation image and the second sample expression image; a discriminative loss value is generated according to the matching probability recognized by the sample discriminative model and the second sample expression image; and a validation loss value is generated according to the label information set and an expression attribute type corresponding to the first sample expression image. The three loss values are combined into the model loss value, and weights of parameters in the sample generative model, the sample discriminative model, and the sample recognition model are adjusted according to the model loss value. After the weights of the parameters are adjusted, the sample augmentation image is generated again by using the foregoing method, the model loss value is calculated again, and the process is repeated, until the model loss value is less than a target threshold, or the model loss value converges, or a quantity of times of loops reaches a target quantity of times. In this case, the sample generative model, the sample discriminative model, and the sample recognition model are completely trained, and subsequently the sample generative model may be determined as the image augmentation model, and the sample recognition model may be determined as the image recognition model. It can be learned from above that there is a sample discriminative model in a training phase, but in an application phase, the sample discriminative model is not required.

Since the image augmentation model includes the first augmentation sub-model and the second augmentation sub-model, the sample generative model includes a first generative sub-model and a second generative sub-model correspondingly. The weight of the parameter of the sample generative model is adjusted according to the model loss value. That is, a weight of a parameter of the first generative sub-model and a weight of a parameter of the second generative sub-model are adjusted according to the model loss value.

Step S306. Obtain an original expression image belonging to the first expression type, and input the original expression image into an image augmentation model, the original expression image belonging to the first expression type being an image including a microexpression, the image augmentation model being obtained by training with a sample expression image belonging to the first expression type and a sample expression image belonging to the second expression type, and an expression intensity of the sample expression image belonging to the second expression type being greater than an expression intensity of the sample expression image belonging to the first expression type.

Step S307. Augment, in the image augmentation model, an expression feature of the microexpression in the original expression image to obtain a target expression image belonging to the second expression type.

Step S308. Recognize an expression attribute type corresponding to the target expression image, and determine the expression attribute type corresponding to the target expression image as an expression attribute type corresponding to the original expression image.

For a specific implementation of steps S306 to S308, reference may be made to steps S101 to S103 in the foregoing embodiment corresponding to FIG. 2, and for a specific process of augmenting the expression feature, reference may be made to steps S201 to S203 in the foregoing embodiment corresponding to FIG. 3. Details are not described herein again.

Figure 6:
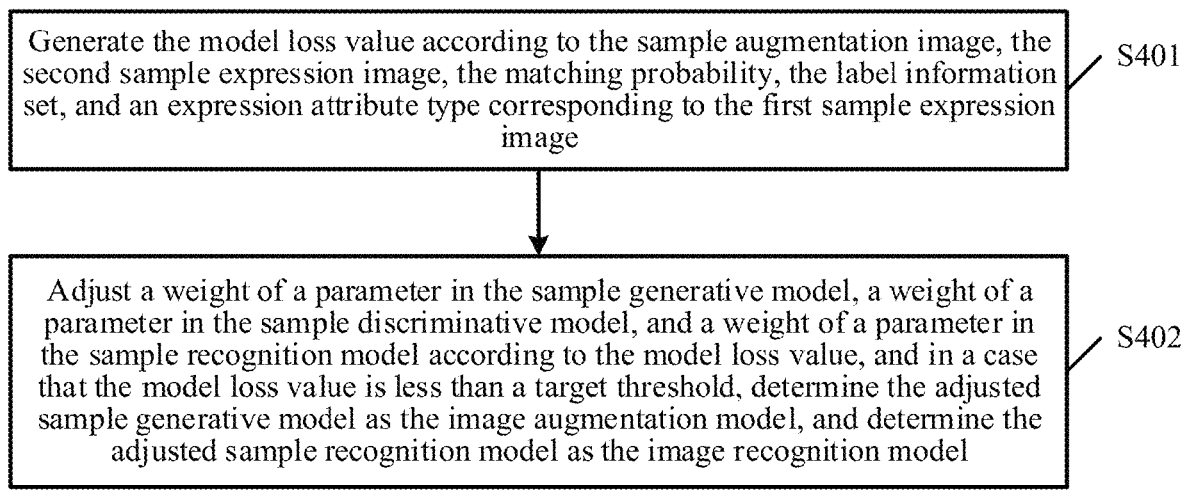
FIG. 6 is a schematic flowchart of generating a model loss value according to an embodiment of this application.

Further, FIG. 6 is a schematic flowchart of generating a model loss value according to an embodiment of this application. As shown in FIG. 6, a specific process of generating the model loss value includes the following step S401 and step S402, and step S401 and step S402 are a specific embodiment of step S305 in the embodiment corresponding to FIG. 5.

Step S401: Generate the model loss value according to the sample augmentation image, the second sample expression image, the matching probability, the label information set, and an expression attribute type corresponding to the first sample expression image.

Specifically, an error between the generated sample augmentation image and the second sample expression image with a high expression intensity (exaggerated expression) may be calculated according to the sample augmentation image and the second sample expression image, and a generative loss value between each pixel point in the sample augmentation image and each pixel point of the second sample expression image may be calculated by using formula (2):

$$L_1 = \|z - T(x)\|_2^2 \tag{2}$$

where x represents a microexpression image, z represents a real exaggerated image, T represents expression feature augmentation of the microexpression image, and T(x) represents the sample augmentation image. The generative loss value calculated by using formula (2) is used for ensuring that an image (an image obtained after an expression feature is augmented) generated by the sample generative model has an expression intensity as high as possible during subsequent adjustment of the sample generative model. That is, an expression in the augmented image needs to be as exaggerated as possible.

For the sample discriminative model, because the sample augmentation image is an image generated by the model rather than an actually acquired image, the sample augmentation image does not belong to the real expression type. Further, for the sample discriminative model, it is expected that a matching probability that the sample augmentation image belongs to the real expression type is 0. That is, it is expected that a recognized label corresponding to the sample augmentation image is 0. Therefore, according to the matching probability (a binary classification matching probability respectively corresponds to a possibility of being a real expression and a possibility of being a simulated expression) determined by the sample discriminative model and the second sample expression image, an error corresponding to the sample discriminative model may be calculated based on formula (3):

$$L_2 = \log D(z) + \log(1 - D(T(x))) \tag{3}$$

where T(x) represents the sample augmentation image, z represents the second sample expression image, and x represents the first sample expression image. D(z) represents a probability of recognizing that the second sample expression image belongs to the real expression type, and D(T(z)) represents a probability of recognizing that the sample augmentation image belongs to the real expression type. An image belonging to the real expression type herein refers to an actually acquired facial expression image rather than a simulated facial expression image created by the model.

For the sample generative model, it is expected that a matching probability that the sample augmentation image is recognized to belong to the real expression type is 1. That is, it is expected that a recognized label corresponding to the sample augmentation image is 1. Therefore, according to the matching probability (a binary classification matching probability) determined by the sample discriminative model and the recognized label 1 corresponding to the sample augmentation image, an error corresponding to the sample generative model may be calculated based on formula (4):

$$L_3 = \log(1 - D(T(x))) \tag{4}$$

where D(T(z)) represents a probability of recognizing that the sample augmentation image belongs to the real expression type.

A sum of the two errors is referred to as a discriminative loss value. The discriminative loss value may be calculated by using formula (5):

$$L_4 = L_2 + L_3 \tag{5}$$

where $L_2$ represents the error corresponding to the sample discriminative model, and $L_3$ represents the error corresponding to the sample generative model. The discriminative loss value calculated by using formula (5) is used for: during subsequent adjustment of the sample generative model and the sample discriminative model, ensuring that the sample augmentation image generated by the sample generative model is as real as possible and a determining result of the sample discriminative model is as accurate as possible, or ensuring that a balance between the sample generative model and the sample discriminative model can be reached.

A validation loss value between a result recognized by the sample recognition model and a real result is determined according to the label information set determined by the sample recognition model and the expression attribute type (a real expression attribute type) corresponding to the first sample expression image, and the validation loss value may be calculated by using formula (6):

$$L_5 = \sum_x p(x) \log q(x) \tag{6}$$

where p(x) represents the label information set recognized by the sample recognition model, and q(x) represents the real expression attribute type corresponding to the first sample expression image. The validation loss value calculated by using formula (6) is used for: during subsequent adjustment of the sample recognition model, ensuring that an expression attribute type of an image (an image obtained after an expression feature is augmented) determined by the sample recognition model is as accurate as possible, or ensuring that the expression attribute type recognized from the sample augmentation image is the same as the expression attribute type of the first sample expression image as possible.

To enable the three loss values to cooperatively adjust the sample generative model, the sample discriminative model, and the sample recognition model, the three loss values are combined into the model loss value. The combination manner may adopt formula (7):

$$L_6 = L_1 + \alpha \cdot L_4 + \beta \cdot L_5 \tag{7}$$

where α and β are connection weights, and the values thereof are between 0 and 1. $L_1$ represents the generative loss value, $L_4$ represents the discriminative loss value, and $L_5$ the validation loss value. The model loss value may be combined and understood as that: the generative loss value ensures that the sample augmentation image is as exaggerated as possible, the discriminative loss value ensures that the sample augmentation image is as real as possible, and the validation loss value ensures that the expression attribute type of the sample augmentation image is as accurate as possible. In this way, the combined model loss value ensures that the sample augmentation image is exaggerated, real and an expression attribute type thereof is accurate.

Step S402. Adjust a weight of a parameter in the sample generative model, a weight of a parameter in the sample discriminative model, and a weight of a parameter in the sample recognition model according to the model loss value, and in a case that the model loss value is less than a target threshold, determine the adjusted sample generative model as the image augmentation model, and determine the adjusted sample recognition model as the image recognition model.

The weights of the parameters in the sample generative model, the sample discriminative model, and the sample recognition model are adjusted according to the model loss value. After the weights of the parameters are adjusted, the sample augmentation image is generated again by using the foregoing method, the model loss value is calculated again, and the process is repeated, until the model loss value is less than the target threshold, or the model loss value converges, or a quantity of times of loops reaches a target quantity of times. In this case, the sample generative model, the sample discriminative model, and the sample recognition model are completely trained, and then the sample generative model may be determined as the image augmentation model for augmenting the expression feature, and the sample recognition model may be determined as the image recognition model for recognizing the expression attribute type.

Figure 7:
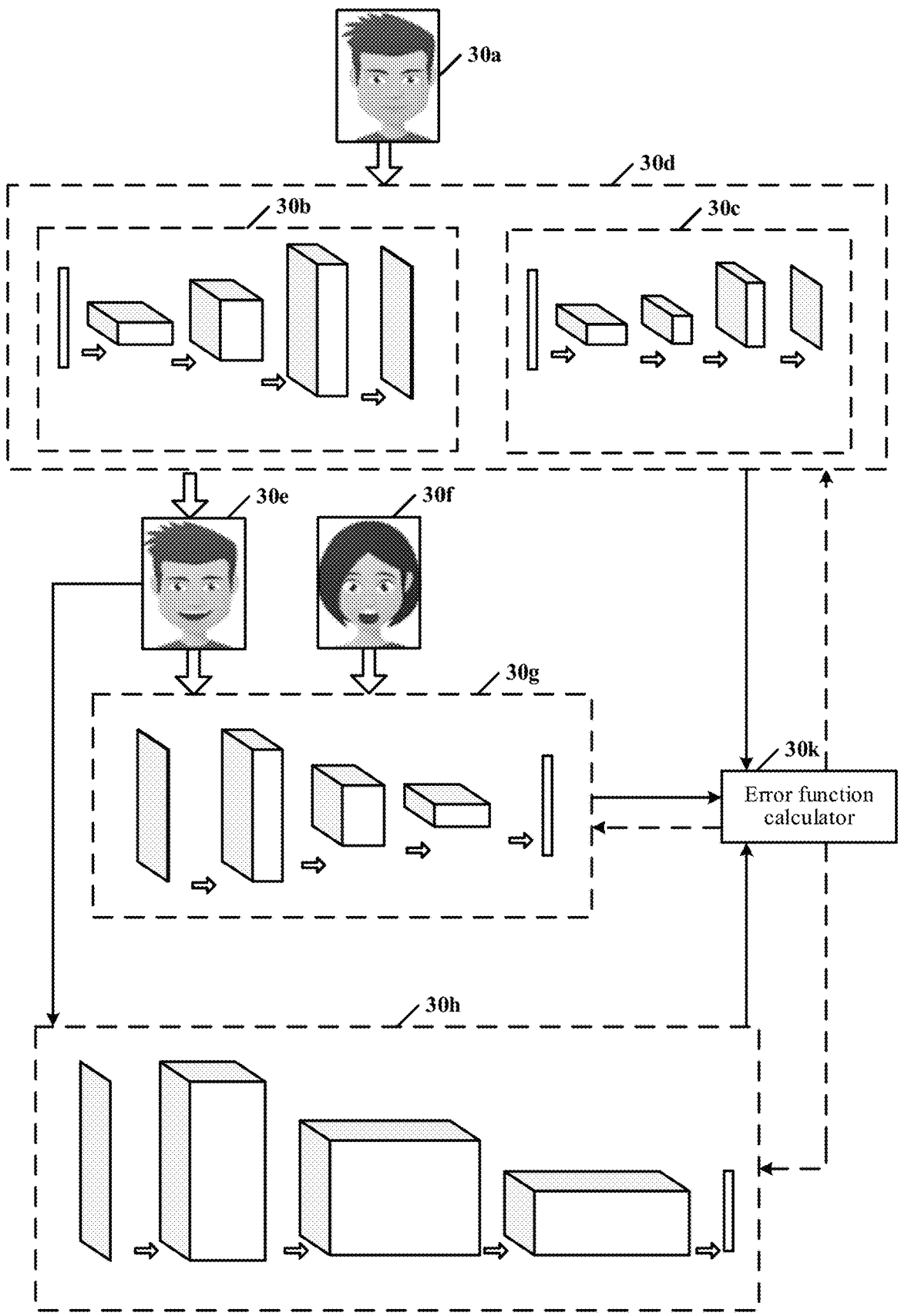
FIG. 7 is a schematic diagram of calculating a model loss value according to an embodiment of this application.

FIG. 7 is a schematic diagram of calculating a model loss value according to an embodiment of this application. A first sample expression image 30e is inputted into a sample generative model 30d (the sample generative model 30d includes a first generative sub-model 30b and a second generative sub-model 30c) to obtain a sample augmentation image 30e. The sample augmentation image 30e is inputted into a sample discriminative model 30g, and a matching probability that the sample augmentation image 30e belongs to a real expression type is calculated. The sample augmentation image 30e is then inputted into a sample recognition model 30h, matching degrees between the sample augmentation image 30e and a plurality of expression attribute types are calculated, and a plurality of matching degrees and corresponding expression attribute types are combined into a label information set. An error function calculator 30k calculates a generative loss value according to the sample augmentation image 30e, a second sample expression image 30f, and formula (2); the error function calculator 30k calculates a discriminative loss value according to the matching probability that the sample augmentation image 30e belongs to the real expression type, a matching probability that the second sample expression image 30f belongs to the real expression type, formula (3), formula (4), and formula (5); and the error function calculator 30k calculates a validation loss value according to the label information set, a real expression attribute type corresponding to a first sample expression image 30a, and formula (6). The error function calculator 30k combines the three loss values into a model loss value, adjusts a weight of a parameter in the sample generative model 30d (the first generative sub-model 30b and the second generative sub-model 30c) according to the model loss value, adjusts a weight of a parameter in the sample discriminative model 30g according to the model loss value, and adjusts a weight of a parameter in the sample recognition model 30h according to the model loss value.

It is ensured by using the three loss values that the sample augmentation image is exaggerated and real and an expression attribute type thereof is accurate, and the discriminative loss value and the validation loss value may be combined into one loss value. A specific process is that a first sample expression image belonging to a first expression type is obtained, and a second sample expression image belonging to a second expression type is obtained. A description is made below still by using one first sample expression image and one second sample expression image as an example. A sample generative model is initialized, and an expression feature of a microexpression in the first sample expression image is augmented based on the sample generative model to obtain a sample augmentation image.

After the sample augmentation image generated by the sample generative model is obtained, a sample discriminative model is initialized, and the sample discriminative model may be a classification model based on a convolutional neural network. Structure feature information (referred to as third structure feature information) corresponding to the sample augmentation image is extracted based on the sample discriminative model, and that the sample augmentation image belongs to a real expression type and joint matching probabilities that the sample augmentation image matches a plurality of expression attribute types are recognized according to a classifier in the sample discriminative model and the third structure feature information. A quantity of joint matching probabilities is the same as a quantity of expression attribute types in the discriminative model, and the third structure feature information is hidden advanced feature information mainly reflecting that the sample augmentation image is a real image and reflecting an attribute type of the sample augmentation image. It may alternatively be understood herein as that the sample discriminative model and the sample recognition model are combined into a sample discriminative model. Similarly, an error between the generated sample augmentation image and the second sample expression image with a high expression intensity (exaggerated expression) may be calculated according to the sample augmentation image and the second sample expression image, and a generative loss value between each pixel point in the sample augmentation image and each pixel point of the second sample expression image may be calculated by using formula (2).

A validation loss value between a recognized result and a real result is calculated according to the joint matching probability recognized by the sample discriminative model and a real expression attribute type corresponding to the first sample expression image (the first sample expression image herein belongs to a real expression type). The two loss values are combined into a model loss value. Weights of parameters in the sample generative model and the sample discriminative model are adjusted according to the model loss value. After the weights of the parameters are adjusted, the sample augmentation image is generated again by using the foregoing method, the model loss value is calculated again, and the process is repeated, until the model loss value is less than a target threshold, or the model loss value converges, or a quantity of times of loops reaches a target quantity of times. In this case, the sample generative model and the sample discriminative model are completely trained, and subsequently the sample generative model may be determined as the image augmentation model.

The model loss value may be combined and understood as that: the generative loss value ensures that the sample augmentation image is as exaggerated as possible, the discriminative loss value ensures that the sample augmentation image is as real as possible and the expression attribute type is as accurate as possible. In this way, the combined model loss value ensures that the sample augmentation image is exaggerated, real and an expression attribute type thereof is accurate.

The foregoing is only a process of training the image augmentation model, and an expression attribute type of an image further needs to be recognized subsequently, or the image recognition model and the image augmentation model may be trained separately. Because an image generated by the image augmentation model is exaggerated, real and an expression attribute type thereof is accurate, any subsequent image recognition model with high accuracy in expression recognition may accurately recognize an image obtained after an expression feature is augmented; and because a microexpression image has been converted into an exaggerated expression image, the difficulty in extracting a feature of the exaggerated expression image and recognizing an expression attribute type of the exaggerated expression image is greatly reduced.

Figure 8:
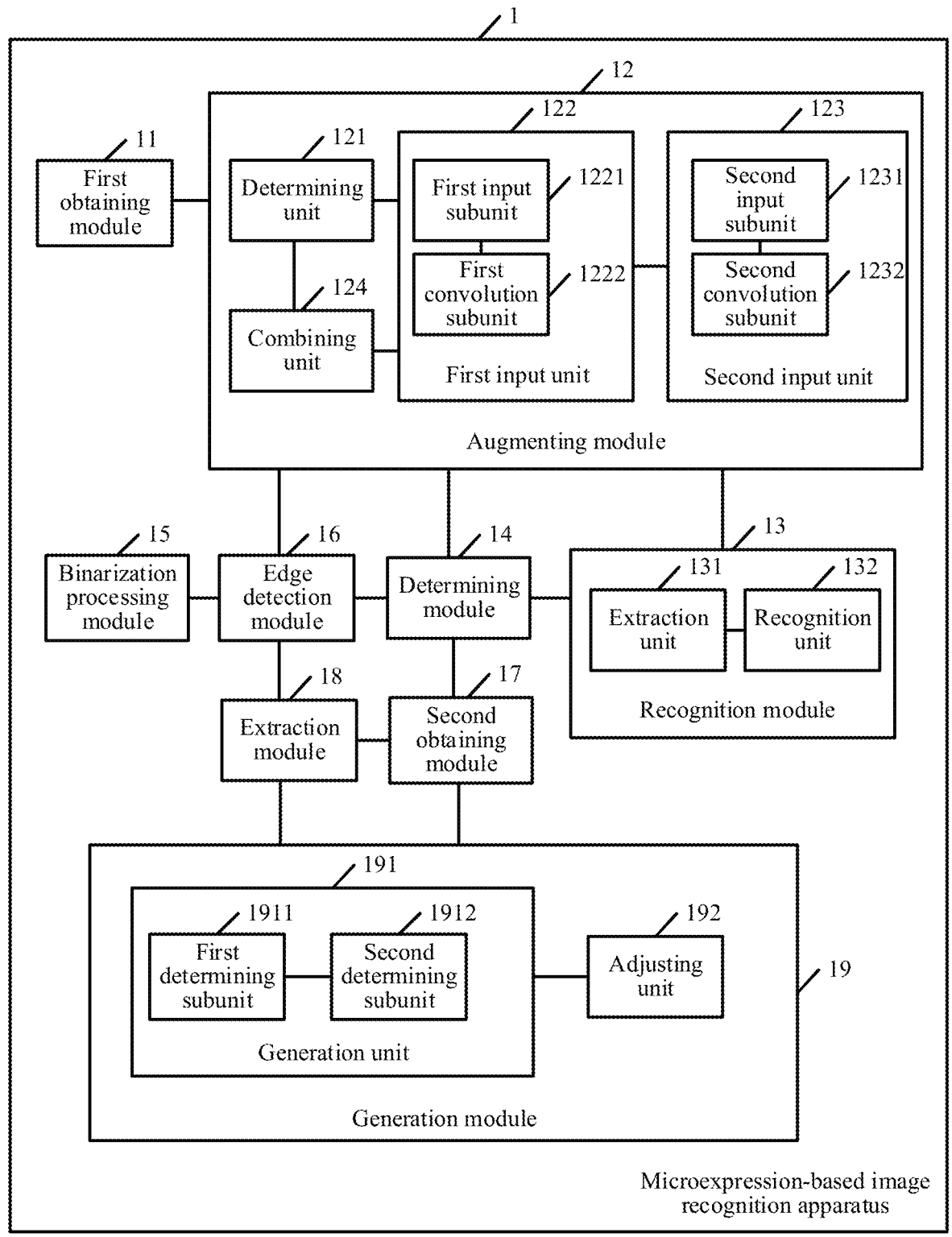
FIG. 8 is a schematic structural diagram of a microexpression-based image recognition apparatus according to an embodiment of this application.

Further, FIG. 8 is a schematic structural diagram of a microexpression-based image recognition apparatus according to an embodiment of this application. As shown in FIG. 8, the microexpression-based image recognition apparatus 1 may include: a first obtaining module 11, an augmenting module 12, a recognition module 13, and a determining module 14.

The first obtaining module 11 is configured to obtain an original expression image belonging to a first expression type, and input the original expression image into an image augmentation model, the original expression image belonging to the first expression type being an image including a microexpression, the image augmentation model being obtained by training with a sample expression image belonging to the first expression type and a sample expression image belonging to a second expression type, and an expression intensity of the sample expression image belonging to the second expression type being greater than an expression intensity of the sample expression image belonging to the first expression type.

The augmenting module 12 is configured to augment, in the image augmentation model, an expression feature of the microexpression in the original expression image, to obtain a target expression image belonging to the second expression type.

The recognition module 13 is configured to recognize an expression attribute type corresponding to the target expression image.

The determining module 14 is configured to determine the expression attribute type corresponding to the target expression image as an expression attribute type corresponding to the original expression image.

For a specific functional implementation of the first obtaining module 11, the augmenting module 12, the recognition module 13, and the determining module 14, reference may be made to steps S101 to S103 in the foregoing embodiment corresponding to FIG. 3, and details are not described herein again.

Referring to FIG. 8, the augmenting module 12 may include: a determining unit 121, a first input unit 122, a second input unit 123, and a combining unit 124.

The determining unit 121 is configured to determine an expression identification area in the original expression image as a unit original expression image.

The first input unit 122 is configured to input the unit original expression image into a first augmentation sub-model, and augment an expression feature of the unit original expression image in the first augmentation sub-model, to obtain a unit auxiliary image.

The second input unit 123 is configured to input the original expression image into a second augmentation sub-model, and augment an expression feature of the original expression image in the second augmentation sub-model, to obtain a target auxiliary image.

The combining unit 124 is configured to combine the unit auxiliary image and the target auxiliary image into the target expression image according to location information of the unit original expression image in the original expression image.

For specific functional implementation of the determining unit 121, the first input unit 122, the second input unit 123, and the combining unit 124, reference may be made to steps S201 to S203 in the foregoing embodiment corresponding to FIG. 4, and details are not described herein again.

Referring to FIG. 8, the first input unit 122 may include: a first input subunit 1221 and a first convolution subunit 1222.

The first input subunit 1221 is configured to input the unit original expression image into an input layer of the first augmentation sub-model to obtain a first original matrix corresponding to the unit original expression image.

The first convolution subunit 1222 is configured to perform random sampling in the first original matrix to obtain a first original vector with a target length, perform deconvolution processing on the first original vector according to a transposed convolution layer in the first augmentation sub-model to obtain a first target tensor, and determine the first target tensor as the unit auxiliary image.

For a specific functional implementation of the first input subunit 1221 and the first convolution subunit 1222, reference may be made to step S201 in the foregoing embodiment corresponding to FIG. 4, and details are not described herein again.

Referring to FIG. 8, the second input unit 123 may include: a second input subunit 1231 and a second convolution subunit 1232.

The second input subunit 1231 is configured to input the original expression image into an input layer of the second augmentation sub-model to obtain a second original matrix corresponding to the original expression image.

The second convolution subunit 1232 is configured to perform random sampling in the second original matrix to obtain a second original vector with the target length, perform deconvolution processing on the second original vector according to a transposed convolution layer in the second augmentation sub-model to obtain a second target tensor, and determine the second target tensor as the target auxiliary image.

For a specific functional implementation of the second input subunit 1231 and the second convolution subunit 1232, reference may be made to step S202 in the foregoing embodiment corresponding to FIG. 4, and details are not described herein again.

Referring to FIG. 8, the microexpression-based image recognition apparatus 1 may include: the first obtaining module 11, the augmenting module 12, the recognition module 13, and the determining module 14, and may further include: a binarization processing module 15 and an edge detection module 16.

The binarization processing module 15 is configured to perform binarization processing on the original expression image to obtain a binary image.

The edge detection module 16 is configured to perform edge detection on the binary image based on a gradient operator to obtain a gradient image, and determine target location information of an edge contour in the gradient image.

The determining module 14 is further configured to determine, in the original expression image, an area identified by the target location information as the expression identification area.

For a specific functional implementation of the binarization processing module 15 and the edge detection module 16, reference may be made to step S102 in the foregoing embodiment corresponding to FIG. 3, and details are not described herein again.

Referring to FIG. 8, the recognition module 13 may include: an extraction unit 131 and a recognition unit 132.

The extraction unit 131 is configured to input the target expression image into an image recognition model.

The extraction unit 131 is further configured to extract target structure feature information corresponding to the target expression image according to convolution processing of a forward convolution layer and pooling processing of a pooling layer in the image recognition model.

The recognition unit 132 is configured to recognize matching degrees between the target structure feature information and a plurality of expression attribute type features in the image recognition model according to a classifier in the image recognition model, and use an expression attribute type corresponding to a maximum matching degree among a plurality of matching degrees obtained from the target structure feature information, as the expression attribute type corresponding to the target expression image.

For a specific functional implementation of the extraction unit 131 and the recognition unit 132, reference may be made to step S103 in the foregoing embodiment corresponding to FIG. 3, and details are not described herein again.

Referring to FIG. 8, the microexpression-based image recognition apparatus 1 may include: the first obtaining module 11, the augmenting module 12, the recognition module 13, the determining module 14, the binarization processing module 15, and the edge detection module 16, and may further include: a second obtaining module 17, an extraction module 18, and a generation module 19.

The second obtaining module 17 is configured to obtain a first sample expression image belonging to the first expression type, and obtain a second sample expression image belonging to the second expression type.

The determining module 14 is further configured to augment an expression feature of a microexpression in the first sample expression image based on a sample generative model to obtain a sample augmentation image.

The extraction module 18 is configured to extract first structure feature information corresponding to the sample augmentation image based on the sample discriminative model, and recognize a matching probability corresponding to the first structure feature information according to a classifier in the sample discriminative model, the matching probability being used for representing a probability that the sample augmentation image belongs to a real expression type.

The extraction module 18 is further configured to extract second structure feature information corresponding to the sample augmentation image based on a sample recognition model, and recognize a label information set corresponding to the second structure feature information according to a classifier in the sample recognition model, the label information set being used for representing matching degrees between the sample augmentation image and a plurality of expression attribute types.

The generation module 19 is configured to generate a model loss value according to the sample augmentation image, the second sample expression image, the matching probability, and the label information set, and determine the image augmentation model and the image recognition model according to the model loss value.

For a specific functional implementation of the second obtaining module 17, the extraction module 18, and the generation module 19, reference may be made to steps S301 to S305 in the foregoing embodiment corresponding to FIG. 5, and details are not described herein again.

Referring to FIG. 8, the generation module 19 may include: a generation unit 191 and an adjusting unit 192.

The generation unit 191 is configured to generate the model loss value according to the sample augmentation image, the second sample expression image, the matching probability, the label information set, and an expression attribute type corresponding to the first sample expression image.

The adjusting unit 192 is configured to adjust a weight of a parameter in the sample generative model, a weight of a parameter in the sample discriminative model, and a weight of a parameter in the sample recognition model according to the model loss value, and in a case that the model loss value is less than a target threshold, determine the adjusted sample generative model as the image augmentation model, and determine the adjusted sample recognition model as the image recognition model.

For a specific functional implementation of the generation unit 191 and the adjusting unit 192, reference may be made to step S401 and step S402 in the foregoing embodiment corresponding to FIG. 6, and details are not described herein again.

Referring to FIG. 8, the generation unit 191 may include: a first determining subunit 1911 and a second determining subunit 1912.

The first determining subunit 1911 is configured to determine a generative loss value according to the sample augmentation image and the second sample expression image.

The first determining subunit 1911 is further configured to determine a discriminative loss value according to the matching probability and the second sample expression image.

The second determining subunit 1912 is configured to determine a validation loss value according to the label information set and the expression attribute type corresponding to the first sample expression image.

The second determining subunit 1912 is further configured to generate the model loss value according to the generative loss value, the discriminative loss value, and the validation loss value.

For a specific functional implementation of the first determining subunit 1911 and the second determining subunit 1912, reference may be made to step S401 in the foregoing embodiment corresponding to FIG. 6, and details are not described herein again.

In the embodiments of this application, an original expression image belonging to a first expression type is obtained, and the original expression image is inputted into an image augmentation model; the original expression image belonging to the first expression type is an image including a microexpression; the image augmentation model is obtained by training with a sample expression image belonging to the first expression type and a sample expression image belonging to a second expression type; an expression intensity of the sample expression image belonging to the second expression type is greater than an expression intensity of the sample expression image belonging to the first expression type; an expression feature of the microexpression in the original expression image is augmented in the image augmentation model to obtain a target expression image belonging to the second expression type; an expression attribute type corresponding to the target expression image is recognized; and the expression attribute type corresponding to the target expression image is determined as an expression attribute type corresponding to the original expression image. It can be learned from above that an expression feature of a microexpression in a microexpression image is augmented by using an image augmentation model, so that the microexpression image is converted into a target expression image with high recognizability and a high expression intensity, an expression attribute type of the target expression image is recognized by using an expression distinguishing feature of the target expression image, and is used as an expression attribute type of the microexpression image. Since the expression feature of the target expression image obtained after the expression feature is augmented is distinguishable, the expression attribute type of the target expression image can be accurately recognized, to improve accuracy of recognizing the microexpression image.

Figure 9:
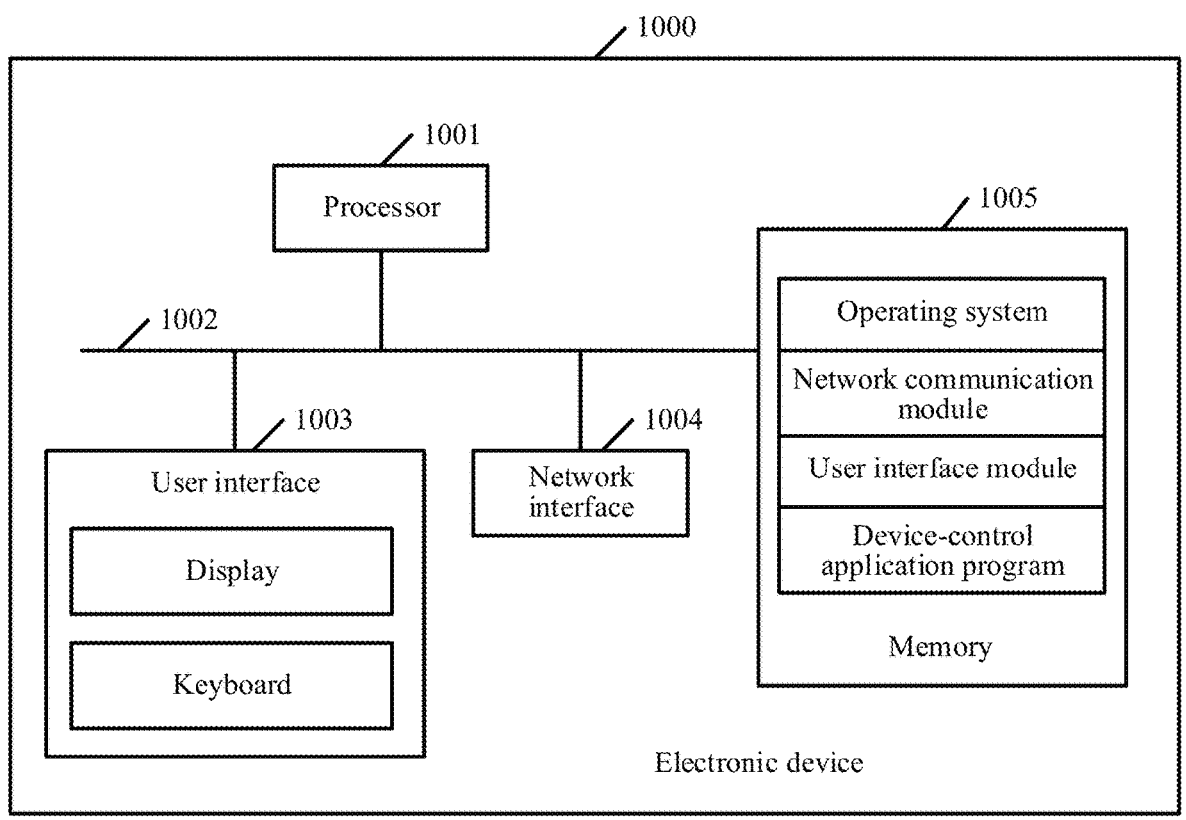
FIG. 9 is a schematic structural diagram of an electronic device according to an embodiment of this application.

Further, FIG. 9 is a schematic structural diagram of an electronic device according to an embodiment of this application. As shown in FIG. 9, the microexpression-based image recognition apparatus 1 in FIG. 8 may be applicable to the electronic device 1000. The electronic device 1000 may include a processor 1001, a network interface 1004, and a memory 1005. In addition, the electronic device 1000 may further include: a user interface 1003 and at least one communication bus 1002. The communication bus 1002 is configured to implement connection and communication between these components. The user interface 1003 may include a display and a keyboard. The user interface 1003 may further include a standard wired interface and a standard wireless interface. The network interface 1004 may include a standard wired interface and a standard wireless interface (such as a Wi-Fi interface). The memory 1005 may be a high-speed RAM, or may be a non-volatile memory, for example, at least one magnetic disk memory. The memory 1005 may alternatively be at least one storage apparatus located away from the processor 1001. As shown in FIG. 9, the memory 1005 used as a computer storage medium may include an operating system, a network communication module, a user interface module, and a device-control application program.

In the electronic device 1000 shown in FIG. 9, the network interface 1004 may provide a network communication function, and the user interface 1003 is mainly configured to provide an input interface for a user. The processor 1001 may be configured to invoke the device-control application program, stored in the memory 1005, to implement:

obtaining an original expression image belonging to a first expression type, and inputting the original expression image into an image augmentation model, the original expression image belonging to the first expression type being an image including a microexpression, the image augmentation model being obtained by training with a sample expression image belonging to the first expression type and a sample expression image belonging to a second expression type, and an expression intensity of the sample expression image belonging to the second expression type being greater than an expression intensity of the sample expression image belonging to the first expression type;

augmenting, in the image augmentation model, an expression feature of the microexpression in the original expression image, to obtain a target expression image belonging to the second expression type; and recognizing an expression attribute type corresponding to the target expression image, and determining the expression attribute type corresponding to the target expression image as an expression attribute type corresponding to the original expression image.

In an embodiment, the image augmentation model includes a first augmentation sub-model and a second augmentation sub-model.

The processor 1001, when performing the step of augmenting, in the image augmentation model, an expression feature of the microexpression in the original expression image to obtain a target expression image belonging to the second expression type, specifically performs the following steps:

determining an expression identification area in the original expression image as a unit original expression image, inputting the unit original expression image into the first augmentation sub-model, and augmenting an expression feature of the unit original expression image in the first augmentation sub-model, to obtain a unit auxiliary image;

inputting the original expression image into the second augmentation sub-model, and augmenting an expression feature of the original expression image in the second augmentation sub-model, to obtain a target auxiliary image; and combining the unit auxiliary image and the target auxiliary image into the target expression image according to location information of the unit original expression image in the original expression image.

In an embodiment, the processor 1001, when performing the step of inputting the unit original expression image into the first augmentation sub-model, and augmenting an expression feature of the unit original expression image in the first augmentation sub-model, to obtain a unit auxiliary image, specifically performs the following steps:

inputting the unit original expression image into an input layer of the first augmentation sub-model to obtain a first original matrix corresponding to the unit original expression image; and performing random sampling in the first original matrix to obtain a first original vector with a target length, performing deconvolution processing on the first original vector according to a transposed convolution layer in the first augmentation sub-model, to obtain a first target tensor, and determining the first target tensor as the unit auxiliary image.

In an embodiment, the processor 1001, when performing the step of inputting the original expression image into the second augmentation sub-model, and augmenting an expression feature of the original expression image in the second augmentation sub-model, to obtain a target auxiliary image, specifically performs the following steps:

inputting the original expression image into an input layer of the second augmentation sub-model to obtain a second original matrix corresponding to the original expression image; and performing random sampling in the second original matrix to obtain a second original vector with the target length, performing deconvolution processing on the second original vector according to a transposed convolution layer in the second augmentation sub-model to obtain a second target tensor, and determining the second target tensor as the target auxiliary image.

In an embodiment, the processor 1001 further performs the following steps:

performing binarization processing on the original expression image to obtain a binary image;

performing edge detection on the binary image based on a gradient operator to obtain a gradient image, and determining target location information of an edge contour in the gradient image; and determining, in the original expression image, an area identified by the target location information as the expression identification area.

In an embodiment, the processor 1001, when performing the step of recognizing an expression attribute type corresponding to the target expression image, specifically performs the following steps:

inputting the target expression image into an image recognition model;

extracting target structure feature information corresponding to the target expression image according to convolution processing of a forward convolution layer and pooling processing of a pooling layer in the image recognition model; and recognizing matching degrees between the target structure feature information and a plurality of expression attribute type features in the image recognition model according to a classifier in the image recognition model, and using an expression attribute type corresponding to a maximum matching degree among a plurality of matching degrees obtained from the target structure feature information, as the expression attribute type corresponding to the target expression image.

In an embodiment, the processor 1001 further performs the following steps:

obtaining a first sample expression image belonging to the first expression type, and obtaining a second sample expression image belonging to the second expression type;

augmenting an expression feature of a microexpression in the first sample expression image based on a sample generative model, to obtain a sample augmentation image;

extracting first structure feature information corresponding to the sample augmentation image based on a sample discriminative model, and recognizing a matching probability corresponding to the first structure feature information according to a classifier in the sample discriminative model, the matching probability being used for representing a possibility that the sample augmentation image belongs to a real expression type;

extracting second structure feature information corresponding to the sample augmentation image based on a sample recognition model, and recognizing a label information set corresponding to the second structure feature information according to a classifier in the sample recognition model, the label information set being used for representing matching degrees between the sample augmentation image and a plurality of expression attribute types; and generating a model loss value according to the sample augmentation image, the second sample expression image, the matching probability, and the label information set, and determining the image augmentation model and the image recognition model according to the model loss value.

In an embodiment, the processor 1001, when performing the step of generating a model loss value according to the sample augmentation image, the second sample expression image, the matching probability, and the label information set, and determining the image augmentation model and the image recognition model according to the model loss value, specifically performs the following steps:

generating the model loss value according to the sample augmentation image, the second sample expression image, the matching probability, the label information set, and an expression attribute type corresponding to the first sample expression image; and adjusting a weight of a parameter in the sample generative model, a weight of a parameter in the sample discriminative model, and a weight of a parameter in the sample recognition model according to the model loss value, and in a case that the model loss value is less than a target threshold, determining the adjusted sample generative model as the image augmentation model, and determining the adjusted sample recognition model as the image recognition model.

In an embodiment, the model loss value includes: a generative loss value, a discriminative loss value, and a validation loss value.

The processor 1001, when performing the step of generating the model loss value according to the sample augmentation image, the second sample expression image, the matching probability, the label information set, and an expression attribute type corresponding to the first sample expression image, specifically performs the following steps:

determining the generative loss value according to the sample augmentation image and the second sample expression image;

determining the discriminative loss value according to the matching probability and the second sample expression image;

determining the validation loss value according to the label information set and the expression attribute type corresponding to the first sample expression image; and generating the model loss value according to the generative loss value, the discriminative loss value, and the validation loss value.

It can be learned from above that an expression feature of a microexpression in a microexpression image is augmented by using an image augmentation model, so that the microexpression image is converted into a target expression image with high recognizability, and an expression attribute type of the target expression image is recognized by using an expression distinguishing feature of the target expression image, and is used as an expression attribute type of the microexpression image. Since the expression feature of the target expression image is distinguishable, the expression attribute type of the target expression image can be accurately recognized, to improve accuracy of recognizing the microexpression image.

It is to be understood that the electronic device 1000 described in this embodiment of this application may implement the description of the microexpression-based image recognition method in the foregoing embodiments corresponding to FIG. 3 to FIG. 7, and may also implement the description of the microexpression-based image recognition apparatus 1 in the foregoing embodiment corresponding to FIG. 8. Details are not described herein again. In addition, the description of beneficial effects of using the same method are not described herein again.

In addition, the embodiments of this application further provide a computer storage medium, storing a computer program executed by the microexpression-based image recognition apparatus 1 mentioned above, and the computer program includes program instructions. The processor, when executing the program instructions, is capable of implementing the description of the microexpression-based image recognition method in the foregoing embodiments corresponding to FIG. 3 to FIG. 7. Therefore, details are not described herein again. In addition, the description of beneficial effects of using the same method are not described herein again. For technical details that are not disclosed in the computer storage medium embodiments of this application, refer to the descriptions of the method embodiments of this application.

A person of ordinary skill in the art may understand that all or some of the processes of the methods in the foregoing embodiments may be implemented by a computer program instructing relevant hardware. The program may be stored in a computer-readable storage medium. During the execution of the program, processes of the foregoing method embodiments may be included. The storage medium may be a magnetic disk, an optical disc, a read-only memory (ROM), a random access memory (RAM), or the like.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A microexpression-based image recognition method, performed by an electronic device, the method comprising:
    inputting an original expression image belonging to a first expression type into an image augmentation model, the original expression image belonging to the first expression type being an image comprising a microexpression of a person, the image augmentation model being obtained by training with a sample expression image belonging to the first expression type and a sample expression image belonging to a second expression type, and an expression intensity of the sample expression image belonging to the second expression type being greater than an expression intensity of the sample expression image belonging to the first expression type;
    augmenting, in the image augmentation model, an expression feature of the microexpression of the person in the original expression image by:
    (i) extracting a plurality of facial parts corresponding to different organs of a face of the person in the original expression image,
    (ii) adjusting each of the plurality of facial parts according to the second expression type to obtain an exaggerated facial part having a stronger expression intensity than the facial part of the person in the original expression image;
    (iii) adjusting the microexpression of the person in the original expression image in its entirety according to the second expression type to obtain an intermediate expression image of the person having a stronger expression intensity than the microexpression of the person in the original expression image; and
    (iv) combining the plurality of adjusted exaggerated facial parts with the intermediate expression image according to their relative locations in the original expression image, to obtain a target expression image belonging to the second expression type; and
    recognizing an expression attribute type corresponding to the target expression image, and determining the expression attribute type corresponding to the target expression image as an expression attribute type corresponding to the original expression image.

2. The method according to claim 1, wherein the image augmentation model comprises a first augmentation sub-model and a second augmentation sub-model; and
    the augmenting, in the image augmentation model, an expression feature of the microexpression of the person in the original expression image, to obtain a target expression image belonging to the second expression type comprises:
    determining an expression identification area in the original expression image as a unit original expression image, inputting the unit original expression image into the first augmentation sub-model, and augmenting an expression feature of the unit original expression image in the first augmentation sub-model, to obtain a unit auxiliary image;
    inputting the original expression image into the second augmentation sub-model, and augmenting an expression feature of the original expression image in the second augmentation sub-model, to obtain a target auxiliary image; and
    combining the unit auxiliary image and the target auxiliary image into the target expression image according to location information of the unit original expression image in the original expression image.

3. The method according to claim 2, wherein the inputting the unit original expression image into the first augmentation sub-model, and augmenting an expression feature of the unit original expression image in the first augmentation sub-model, to obtain a unit auxiliary image comprises:
    inputting the unit original expression image into an input layer of the first augmentation sub-model to obtain a first original matrix corresponding to the unit original expression image; and
    performing random sampling in the first original matrix, to obtain a first original vector, performing deconvolution processing on the first original vector according to a transposed convolution layer in the first augmentation sub-model to obtain a first target tensor, and determining the first target tensor as the unit auxiliary image.

4. The method according to claim 2, wherein the inputting the original expression image into the second augmentation sub-model, and augmenting an expression feature of the original expression image in the second augmentation sub-model, to obtain a target auxiliary image comprises:
    inputting the original expression image into an input layer of the second augmentation sub-model to obtain a second original matrix corresponding to the original expression image; and
    performing random sampling in the second original matrix to obtain a second original vector, performing deconvolution processing on the second original vector according to a transposed convolution layer in the second augmentation sub-model, to obtain a second target tensor, and determining the second target tensor as the target auxiliary image.

5. The method according to claim 2, further comprising:
    performing binarization processing on the original expression image to obtain a binary image;

performing edge detection on the binary image based on a gradient operator to obtain a gradient image, and determining target location information of an edge contour in the gradient image; and determining, in the original expression image, an area identified by the target location information as the expression identification area.

6. The method according to claim 1, wherein the recognizing an expression attribute type corresponding to the target expression image comprises:

inputting the target expression image into an image recognition model;

extracting target structure feature information corresponding to the target expression image according to convolution processing of a forward convolution layer and pooling processing of a pooling layer in the image recognition model; and recognizing matching degrees between the target structure feature information and a plurality of expression attribute type features in the image recognition model according to a classifier in the image recognition model, and using an expression attribute type corresponding to a maximum matching degree among a plurality of matching degrees obtained from the target structure feature information, as the expression attribute type corresponding to the target expression image.

7. The method according to claim 1, further comprising:

obtaining a first sample expression image belonging to the first expression type, and obtaining a second sample expression image belonging to the second expression type;

augmenting an expression feature of a microexpression in the first sample expression image based on a sample generative model, to obtain a sample augmentation image;

extracting first structure feature information corresponding to the sample augmentation image based on a sample discriminative model, and recognizing a matching probability corresponding to the first structure feature information according to a classifier in the sample discriminative model, the matching probability being used for representing a possibility that the sample augmentation image belongs to a real expression type;

extracting second structure feature information corresponding to the sample augmentation image based on a sample recognition model, and recognizing a label information set corresponding to the second structure feature information according to a classifier in the sample recognition model, the label information set being used for representing matching degrees between the sample augmentation image and a plurality of expression attribute types; and generating a model loss value according to the sample augmentation image, the second sample expression image, the matching probability, and the label information set, and determining the image augmentation model and the image recognition model according to the model loss value.

8. The method according to claim 7, wherein the generating a model loss value according to the sample augmentation image, the second sample expression image, the matching probability, and the label information set, and determining the image augmentation model and the image recognition model according to the model loss value comprises:

generating the model loss value according to the sample augmentation image, the second sample expression image, the matching probability, the label information set, and an expression attribute type corresponding to the first sample expression image; and adjusting a weight of a parameter in the sample generative model, a weight of a parameter in the sample discriminative model, and a weight of a parameter in the sample recognition model according to the model loss value, and in a case that the model loss value is less than a target threshold, determining the adjusted sample generative model as the image augmentation model, and determining the adjusted sample recognition model as the image recognition model.

9. The method according to claim 8, wherein the model loss value comprises a generative loss value, a discriminative loss value, and a validation loss value; and the generating the model loss value according to the sample augmentation image, the second sample expression image, the matching probability, the label information set, and an expression attribute type corresponding to the first sample expression image comprises:

determining the generative loss value according to the sample augmentation image and the second sample expression image;

determining the discriminative loss value according to the matching probability and the second sample expression image;

determining the validation loss value according to the label information set and the expression attribute type corresponding to the first sample expression image; and generating the model loss value according to the generative loss value, the discriminative loss value, and the validation loss value.

10. An electronic device, comprising: a processor and a memory, the processor being connected to the memory, the memory being configured to store a plurality of program instructions, and the processor being configured to execute the plurality of program instructions to perform a plurality of operations including:

inputting an original expression image belonging to a first expression type into an image augmentation model, the original expression image belonging to the first expression type being an image comprising a microexpression of a person, the image augmentation model being obtained by training with a sample expression image belonging to the first expression type and a sample expression image belonging to a second expression type, and an expression intensity of the sample expression image belonging to the second expression type being greater than an expression intensity of the sample expression image belonging to the first expression type;

augmenting, in the image augmentation model, an expression feature of the microexpression of the person in the original expression image by:

(i) extracting a plurality of facial parts corresponding to different organs of a face of the person in the original expression image, (ii) adjusting each of the plurality of facial parts according to the second expression type to obtain an exaggerated facial part having a stronger expression intensity than the facial part of the person in the original expression image;

(iii) adjusting the microexpression of the person in the original expression image in its entirety according to the second expression type to obtain an intermediate expression image of the person having a stronger expression intensity than the microexpression of the person in the original expression image; and (iv) combining the plurality of adjusted exaggerated facial parts with the intermediate expression image according to their relative locations in the original expression image, to obtain a target expression image belonging to the second expression type; and recognizing an expression attribute type corresponding to the target expression image, and determining the expression attribute type corresponding to the target expression image as an expression attribute type corresponding to the original expression image.

11. The electronic device according to claim 10, wherein the image augmentation model comprises a first augmentation sub-model and a second augmentation sub-model; and the augmenting, in the image augmentation model, an expression feature of the microexpression of the person in the original expression image, to obtain a target expression image belonging to the second expression type comprises:

determining an expression identification area in the original expression image as a unit original expression image, inputting the unit original expression image into the first augmentation sub-model, and augmenting an expression feature of the unit original expression image in the first augmentation sub-model, to obtain a unit auxiliary image;

inputting the original expression image into the second augmentation sub-model, and augmenting an expression feature of the original expression image in the second augmentation sub-model, to obtain a target auxiliary image; and combining the unit auxiliary image and the target auxiliary image into the target expression image according to location information of the unit original expression image in the original expression image.

12. The electronic device according to claim 11, wherein the inputting the unit original expression image into the first augmentation sub-model, and augmenting an expression feature of the unit original expression image in the first augmentation sub-model, to obtain a unit auxiliary image comprises:

inputting the unit original expression image into an input layer of the first augmentation sub-model to obtain a first original matrix corresponding to the unit original expression image; and performing random sampling in the first original matrix, to obtain a first original vector, performing deconvolution processing on the first original vector according to a transposed convolution layer in the first augmentation sub-model to obtain a first target tensor, and determining the first target tensor as the unit auxiliary image.

13. The electronic device according to claim 11, wherein the inputting the original expression image into the second augmentation sub-model, and augmenting an expression feature of the original expression image in the second augmentation sub-model, to obtain a target auxiliary image comprises:

inputting the original expression image into an input layer of the second augmentation sub-model to obtain a second original matrix corresponding to the original expression image; and performing random sampling in the second original matrix to obtain a second original vector, performing deconvolution processing on the second original vector according to a transposed convolution layer in the second augmentation sub-model, to obtain a second target tensor, and determining the second target tensor as the target auxiliary image.

14. The electronic device according to claim 11, wherein the plurality of operations further comprise:

performing binarization processing on the original expression image to obtain a binary image;

performing edge detection on the binary image based on a gradient operator to obtain a gradient image, and determining target location information of an edge contour in the gradient image; and determining, in the original expression image, an area identified by the target location information as the expression identification area.

15. The electronic device according to claim 10, wherein the recognizing an expression attribute type corresponding to the target expression image comprises:

inputting the target expression image into an image recognition model;

extracting target structure feature information corresponding to the target expression image according to convolution processing of a forward convolution layer and pooling processing of a pooling layer in the image recognition model; and recognizing matching degrees between the target structure feature information and a plurality of expression attribute type features in the image recognition model according to a classifier in the image recognition model, and using an expression attribute type corresponding to a maximum matching degree among a plurality of matching degrees obtained from the target structure feature information, as the expression attribute type corresponding to the target expression image.

16. The electronic device according to claim 10, wherein the plurality of operations further comprise:

obtaining a first sample expression image belonging to the first expression type, and obtaining a second sample expression image belonging to the second expression type;

augmenting an expression feature of a microexpression in the first sample expression image based on a sample generative model, to obtain a sample augmentation image;

extracting first structure feature information corresponding to the sample augmentation image based on a sample discriminative model, and recognizing a matching probability corresponding to the first structure feature information according to a classifier in the sample discriminative model, the matching probability being used for representing a possibility that the sample augmentation image belongs to a real expression type;

extracting second structure feature information corresponding to the sample augmentation image based on a sample recognition model, and recognizing a label information set corresponding to the second structure feature information according to a classifier in the sample recognition model, the label information set being used for representing matching degrees between the sample augmentation image and a plurality of expression attribute types; and generating a model loss value according to the sample augmentation image, the second sample expression image, the matching probability, and the label information set, and determining the image augmentation model and the image recognition model according to the model loss value.

17. The electronic device according to claim 16, wherein the generating a model loss value according to the sample augmentation image, the second sample expression image, the matching probability, and the label information set, and determining the image augmentation model and the image recognition model according to the model loss value comprises:
generating the model loss value according to the sample augmentation image, the second sample expression image, the matching probability, the label information set, and an expression attribute type corresponding to the first sample expression image; and
adjusting a weight of a parameter in the sample generative model, a weight of a parameter in the sample discriminative model, and a weight of a parameter in the sample recognition model according to the model loss value, and in a case that the model loss value is less than a target threshold, determining the adjusted sample generative model as the image augmentation model, and determining the adjusted sample recognition model as the image recognition model.

18. The electronic device according to claim 17, wherein the model loss value comprises a generative loss value, a discriminative loss value, and a validation loss value; and
the generating the model loss value according to the sample augmentation image, the second sample expression image, the matching probability, the label information set, and an expression attribute type corresponding to the first sample expression image comprises:
determining the generative loss value according to the sample augmentation image and the second sample expression image;
determining the discriminative loss value according to the matching probability and the second sample expression image;
determining the validation loss value according to the label information set and the expression attribute type corresponding to the first sample expression image; and
generating the model loss value according to the generative loss value, the discriminative loss value, and the validation loss value.

19. A non-transitory computer-readable storage medium, storing a plurality of program instructions, the program instructions, when executed by a processor of an electronic device, causing the electronic device to perform a plurality of operations including:
inputting an original expression image belonging to a first expression type into an image augmentation model, the original expression image belonging to the first expression type being an image comprising a microexpression of a person, the image augmentation model being obtained by training with a sample expression image belonging to the first expression type and a sample expression image belonging to a second expression type, and an expression intensity of the sample expression image belonging to the second expression type being greater than an expression intensity of the sample expression image belonging to the first expression type;
augmenting, in the image augmentation model, an expression feature of the microexpression of the person in the original expression image by:
(i) extracting a plurality of facial parts corresponding to different organs of a face of the person in the original expression image,
(ii) adjusting each of the plurality of facial parts according to the second expression type to obtain an exaggerated facial part having a stronger expression intensity than the facial part of the person in the original expression image;
(iii) adjusting the microexpression of the person in the original expression image in its entirety according to the second expression type to obtain an intermediate expression image of the person having a stronger expression intensity than the microexpression of the person in the original expression image; and
(iv) combining the plurality of adjusted exaggerated facial parts with the intermediate expression image according to their relative locations in the original expression image, to obtain a target expression image belonging to the second expression type; and
recognizing an expression attribute type corresponding to the target expression image, and determining the expression attribute type corresponding to the target expression image as an expression attribute type corresponding to the original expression image.

20. The non-transitory computer-readable storage medium according to claim 19, wherein the image augmentation model comprises a first augmentation sub-model and a second augmentation sub-model; and
the augmenting, in the image augmentation model, an expression feature of the microexpression of the person in the original expression image, to obtain a target expression image belonging to the second expression type comprises:
determining an expression identification area in the original expression image as a unit original expression image, inputting the unit original expression image into the first augmentation sub-model, and augmenting an expression feature of the unit original expression image in the first augmentation sub-model, to obtain a unit auxiliary image;
inputting the original expression image into the second augmentation sub-model, and augmenting an expression feature of the original expression image in the second augmentation sub-model, to obtain a target auxiliary image; and
combining the unit auxiliary image and the target auxiliary image into the target expression image according to location information of the unit original expression image in the original expression image.

* * * * *